United States Patent
Chun et al.

(10) Patent No.: US 10,217,258 B2
(45) Date of Patent: Feb. 26, 2019

(54) HEAD MOUNTED DISPLAY AND CONTROL METHOD THEREOF

(71) Applicant: LG ELECTRONICS INC., Seoul (KR)

(72) Inventors: Sinae Chun, Seoul (KR); Doyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/328,316

(22) PCT Filed: Jul. 22, 2014

(86) PCT No.: PCT/KR2014/006629
§ 371 (c)(1),
(2) Date: Jan. 23, 2017

(87) PCT Pub. No.: WO2016/013692
PCT Pub. Date: Jan. 28, 2016

(65) Prior Publication Data
US 2017/0206688 A1    Jul. 20, 2017

(51) Int. Cl.
*G06F 3/01* (2006.01)
*G06T 11/60* (2006.01)
*G02B 27/02* (2006.01)
*H04N 5/64* (2006.01)
*G02B 27/01* (2006.01)
*G06F 3/0482* (2013.01)

(52) U.S. Cl.
CPC ............ *G06T 11/60* (2013.01); *G02B 27/017* (2013.01); *G02B 27/02* (2013.01); *G06F 3/011* (2013.01); *H04N 5/64* (2013.01); *G02B 2027/0178* (2013.01); *G06F 3/0482* (2013.01); *G06T 2200/24* (2013.01)

(58) Field of Classification Search
CPC ...... G02B 27/017; G06F 3/011; G06T 19/006
USPC ....................................................... 345/633
See application file for complete search history.

(56) References Cited

U.S. PATENT DOCUMENTS

| 6,738,040 B2 | 5/2004 | Jahn et al. |
| 2006/0029374 A1 | 2/2006 | Park |
| 2006/0044265 A1 | 3/2006 | Min |

(Continued)

FOREIGN PATENT DOCUMENTS

| EP | 0679984 A1 | 11/1995 |
| GB | 2495159 A | 4/2013 |

(Continued)

*Primary Examiner* — Mark K Zimmerman
*Assistant Examiner* — Jonathan M Cofino
(74) *Attorney, Agent, or Firm* — Birch, Stewart, Kolasch & Birch, LLP

(57) ABSTRACT

Disclosed herein are a mobile terminal and a method for controlling the mobile terminal. The present invention includes a display; a sensor; and a controller configured to display content displayed on the display in a virtual area within the field of vision of a user and to display at least one thumbnail image through which a portion of the content exceeding a critical value is selected and played back when a disturbance value sensed through the sensor exceeds the critical value. According to the present invention, it is possible to provide thumbnail images through which a content portion having a high disturbance value can be played back during display of content.

17 Claims, 32 Drawing Sheets

(56) References Cited

U.S. PATENT DOCUMENTS

| | | | |
|---|---|---|---|
| 2011/0126156 A1* | 5/2011 | Krishnaraj | G06F 3/016 |
| | | | 715/828 |
| 2012/0249416 A1 | 10/2012 | Maciocci et al. | |
| 2012/0317484 A1* | 12/2012 | Gomez | G02B 27/017 |
| | | | 715/716 |
| 2014/0043355 A1* | 2/2014 | Kim | G06T 11/60 |
| | | | 345/592 |
| 2014/0253588 A1* | 9/2014 | Mandala | G02B 27/01 |
| | | | 345/633 |
| 2014/0368540 A1* | 12/2014 | Iguchi | G06K 9/00832 |
| | | | 345/633 |
| 2015/0042679 A1* | 2/2015 | Jarvenpaa | G06T 19/006 |
| | | | 345/633 |

FOREIGN PATENT DOCUMENTS

| | | |
|---|---|---|
| KR | 10-2006-0012746 A | 2/2006 |
| KR | 10-2006-0019273 A | 3/2006 |
| KR | 10-2010-0030820 A | 3/2010 |
| KR | 10-2013-0137692 A | 12/2013 |
| KR | 10-2014-0066258 A | 5/2014 |
| WO | WO 2013/049248 A2 | 4/2013 |

* cited by examiner (a)

(b)

(b)

(b)

(c)

(d)

(d)

HEAD MOUNTED DISPLAY AND CONTROL METHOD THEREOF

CROSS REFERENCE TO RELATED APPLICATIONS

This application is the National Phase of PCT International Application No. PCT/KR2014/006629, filed on Jul. 22, 2014, all of which are hereby expressly incorporated by reference into the present application.

BACKGROUND OF THE INVENTION

Field of the Invention

The present invention relates to a head mounted display capable of providing thumbnail images through which a content portion having a high disturbance value can be played back during display of content in a virtual area and a method of controlling the same.

Description of the Background Art

Terminals may be generally classified as mobile/portable terminals or stationary terminals according to their mobility. Mobile terminals may also be classified as handheld terminals or vehicle mounted terminals according to whether or not a user can directly carry the terminal.

Recently, research on wearable devices that can be worn by users from among mobile terminals has been conducted. A head mounted display (HMD) is one of such wearable devices.

The HMD may have a form similar to glasses. For example, the HMD can be worn by a user like glasses to provide information to the user.

The information provided to the user may be visual information and/or aural information. The visual information can be displayed in a predetermined space within the field of vision of the user. In this manner, the information can be provided in the form of augmented reality (AR).

However, there is need for a method of effectively providing information when a surrounding environment changes during provision of information.

SUMMARY OF THE INVENTION

Accordingly, an object of the present invention is to address the above-noted and other problems. Another object of the present invention is to provide a head mounted display capable of providing thumbnail images through which a content portion having a high disturbance value can be played back during display of content in a virtual area and a method of controlling the same.

In an aspect of the present invention, a head mounted display includes: a display; a sensor; and a controller configured to display content displayed on the display in a virtual area within the field of vision of a user and to display at least one thumbnail image through which a portion of the content exceeding a critical value is selected and played back when a disturbance value sensed through the sensor exceeds the critical value.

In another aspect of the present invention, a method of controlling a head mounted display includes: displaying content in a virtual area within the field of vision of a user; generating at least one thumbnail image through which a portion of the content exceeding a critical value is selected and played back when a disturbance value exceeds the critical value during display of the content; and displaying the generated thumbnail image.

The effects of the head-mounted display and the control method thereof according to the present invention are as follows.

According to at least one of embodiments of the present invention, it is possible to provide thumbnail images through which a content portion having a high disturbance value can be played back again during display of content.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
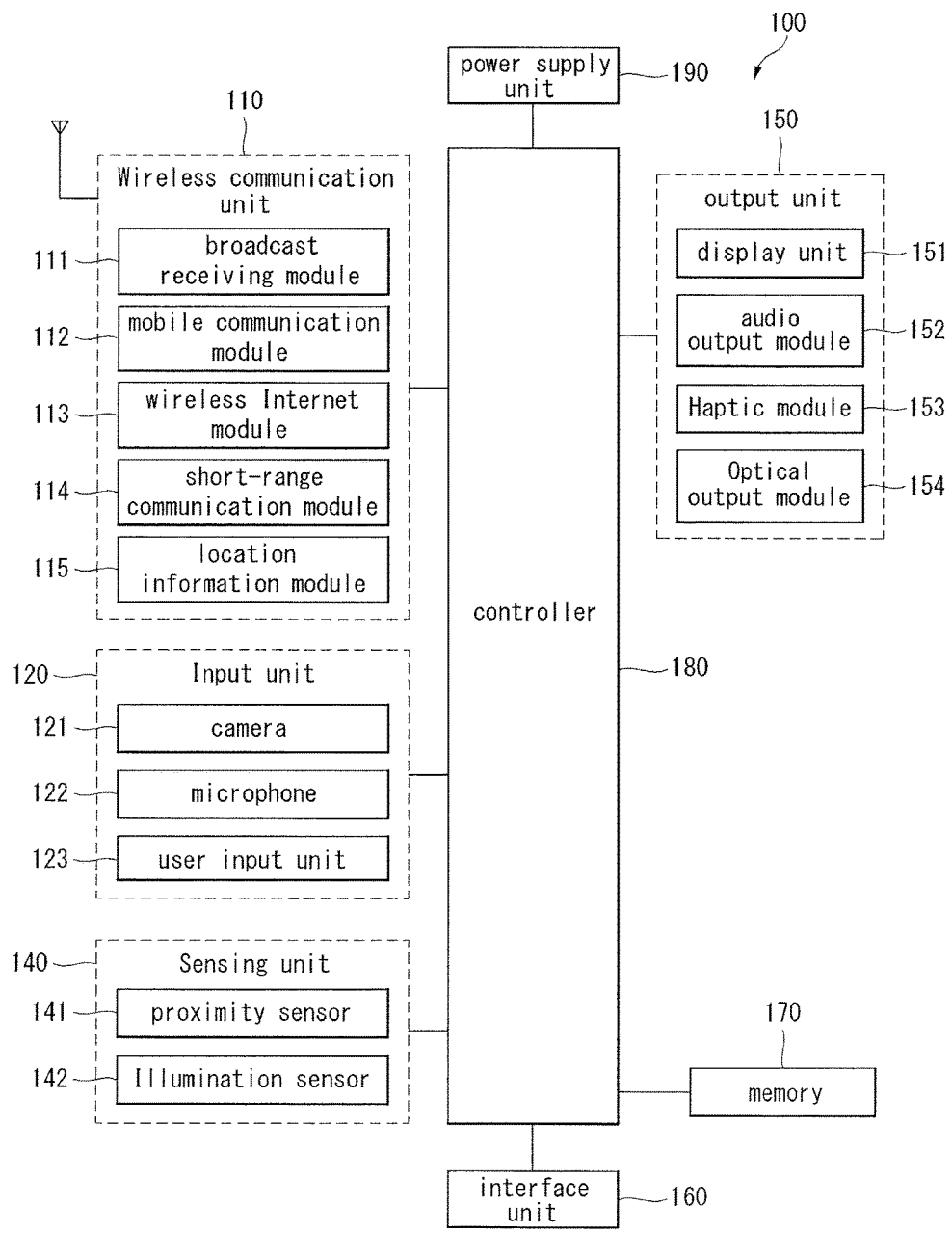
FIG. 1 is a block diagram of an HMD in accordance with the present disclosure.

FIG. 1 is a block diagram of an electronic device in accordance with the present disclosure.

The Head Mounted Display (HMD) 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the HMD 100 and a wireless communication system, communications between the HMD 100 and another HMD, communications between the HMD 100 and an external server. Further, the wireless communication unit 110 typically includes one or more modules which connect the HMD 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the HMD, the surrounding environment of the HMD, user information, and the like. For example, in FIG. 1, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The HMD 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the HMD 100 and a user, as well as function as the user input unit 123 which provides an input interface between the HMD 100 and the user.

The interface unit 160 serves as an interface with various types of external devices that can be coupled to the HMD 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the HMD 100 may perform assorted control functions associated with a connected external device, in response to the external device being connected to the interface unit 160.

The memory 170 is typically implemented to store data to support various functions or features of the HMD 100. For instance, the memory 170 may be configured to store application programs executed in the HMD 100, data or instructions for operations of the HMD 100, and the like. Some of these application programs may be downloaded from an external server via wireless communication. Other application programs may be installed within the HMD 100 at time of manufacturing or shipping, which is typically the case for basic functions of the HMD 100 (for example, receiving a call, placing a call, receiving a message, sending a message, and the like). It is common for application programs to be stored in the memory 170, installed in the HMD 100, and executed by the controller 180 to perform an operation (or function) for the HMD 100.

The controller 180 typically functions to control overall operation of the HMD 100, in addition to the operations associated with the application programs. The controller 180 may provide or process information or functions appropriate for a user by processing signals, data, information and the like, which are input or output by the various components depicted in FIG. 1, or activating application programs stored in the memory 170.

As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the HMD 100. The power supply unit 190 may include a battery, and the battery may be configured to be embedded in the terminal body, or configured to be detachable from the terminal body.

At least some of the components may operate in cooperation with one another to implement an HMD operation, control, or control method according to various embodiments described below. Also, the operation, control, or control method of the HMD can be implemented on the HMD by driving at least one application program stored in the memory 170.

Referring still to FIG. 1, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the HMD. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external HMD, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the HMD 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the HMD 100 and a wireless communication system, communications between the HMD 100 and another HMD 100, or communications between the HMD and a network where another HMD 100 (or an external server) is located, via wireless area networks. One example of the wireless area networks is a wireless personal area networks.

In some embodiments, another HMD (which may be configured similarly to HMD 100) may be a wearable device, for example, a smart watch, a smart glass or a head mounted display (HMD), which is able to exchange data with the HMD 100 (or otherwise cooperate with the HMD 100). The short-range communication module 114 may sense or recognize the wearable device, and permit communication between the wearable device and the HMD 100. In addition, when the sensed wearable device is a device which is authenticated to communicate with the HMD 100, the controller 180, for example, may cause transmission of data processed in the HMD 100 to the wearable device via the short-range communication module 114. Hence, a user of the wearable device may use the data processed in the HMD 100 on the wearable device. For example, when a call is received in the HMD 100, the user may answer the call using the wearable device. Also, when a message is received in the HMD 100, the user can check the received message using the wearable device.

The location information module 115 is generally configured to detect, calculate, derive or otherwise identify a position of the HMD. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the HMD. As one example, when the HMD uses a GPS module, a position of the HMD may be acquired using a signal sent from a GPS satellite. As another example, when the HMD uses the Wi-Fi module, a position of the HMD can be acquired based on information related to a wireless access point (AP) which transmits or receives a wireless signal to or from the Wi-Fi module.

The input unit 120 may be configured to permit various types of input to the HMD 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the HMD 100. As another example, the cameras 121 may be located in a stereoscopic arrangement to acquire left and right images for implementing a stereoscopic image.

The microphone 122 is generally implemented to permit audio input to the HMD 100. The audio input can be processed in various manners according to a function being executed in the HMD 100. If desired, the microphone 122 may include assorted noise removing algorithms to remove unwanted noise generated in the course of receiving the external audio.

The user input unit 123 is a component that permits input by a user. Such user input may enable the controller 180 to control operation of the HMD 100. The user input unit 123 may include one or more of a mechanical input element (for example, a key, a button located on a front and/or rear surface or a side surface of the HMD 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the HMD at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the HMD, surrounding environment information of the HMD, user information, or the like. The controller 180 generally cooperates with the sending unit 140 to control operation of the HMD 100 or execute data processing, a function or an operation associated with an application program installed in the HMD based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the HMD covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the HMD 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller.

The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the HMD 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the HMD 100. For example, the display unit 151 may display execution screen information of an application program executing at the HMD 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the HMD 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the HMD 100.

An optical output module 154 can output a signal for indicating an event generation using light of a light source. Examples of events generated in the HMD 100 may include message reception, call signal reception, a missed call, an alarm, a schedule notice, an email reception, information reception through an application, and the like.

A signal output by the optical output module 154 may be implemented in such a manner that the HMD emits monochromatic light or light with a plurality of colors. The signal output may be terminated as the HMD senses that a user has checked the generated event, for example.

The interface unit 160 serves as an interface for external devices to be connected with the HMD 100. For example, the interface unit 160 can receive data transmitted from an external device, receive power to transfer to elements and components within the HMD 100, or transmit internal data of the HMD 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the HMD 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the HMD 100 is connected with an external cradle, the interface unit 160 can serve as a passage to allow power from the cradle to be supplied to the HMD 100 or may serve as a passage to allow various command signals input by the user from the cradle to be transferred to the HMD there through. Various command signals or power input from the cradle may operate as signals for recognizing that the HMD is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The HMD 100 may also be operated in relation to a network storage device that performs the storage function of the memory 170 over a network, such as the Internet.

The controller 180 may typically control the general operations of the HMD 100. For example, the controller 180 may set or release a lock state for restricting a user from inputting a control command with respect to applications when a status of the HMD meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the HMD 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

The HMD 100 is described with reference to a bar-type terminal body. However, the HMD 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of HMD (for example, bar-type, watch-type, glasses-type, and the like).

However, such teachings with regard to a particular type of HMD will generally apply to other types of HMDs as well.

The HMD 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the HMD 100 may be configured such that one case forms the inner space. In this example, a HMD 100 having a uni-body is formed in such a manner that synthetic resin or metal extends from a side surface to a rear surface.

If desired, the HMD 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The HMD 100 is provided with a display unit 151, first and second sound output units 152a, 152b, a proximity sensor 141, an illumination sensor 142, a light output unit 154, first and second cameras 121a, 121b, first and second manipulation units 123a, 123b, a microphone 122, an interface unit 160, and the like.

In the following, a display unit 151, a first sound output unit 152a, a proximity sensor 141, an illumination sensor 142, an optical output unit 154, a first camera 121a, a second manipulation unit 123b, a microphone 122 and an interface unit 160 are disposed on a side surface of the terminal body and a second sound output unit 152b is provided on a rear surface of the terminal body, And the HMD 100 in which the second camera 121b is disposed will be described as an example.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the HMD 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the HMD 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the HMD 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

The first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the HMD 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the HMD 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the HMD 100, but other locations are possible. If desired, multiple microphones may be implemented, with such an arrangement permitting the receiving of stereo sounds.

The interface unit 160 may serve as a path allowing the HMD 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the HMD 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the HMD 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the HMD 100 can also be provided on the HMD 100. As one example of an accessory, a cover or pouch for covering or accommodating at least one surface of the HMD 100 may be provided. The cover or pouch may cooperate with the display unit 151 to extend the function of the HMD 100. Another example of the accessory is a touch pen for assisting or extending a touch input to a touch screen.

A typical wearable device can exchange data with (or cooperate with) another HMD 100. In such a device, the wearable device generally has functionality that is less than the cooperating HMD. For instance, the short-range communication module 114 of a HMD 100 may sense or recognize a wearable device that is near-enough to communicate with the HMD. In addition, when the sensed wearable device is a device which is authenticated to communicate with the HMD 100, the controller 180 may transmit data processed in the HMD 100 to the wearable device via the short-range communication module 114, for example. Hence, a user of the wearable device can use the data processed in the HMD 100 on the wearable device. For example, when a call is received in the HMD 100, the user can answer the call using the wearable device. Also, when a message is received in the HMD 100, the user can check the received message using the wearable device.

Figure 2:
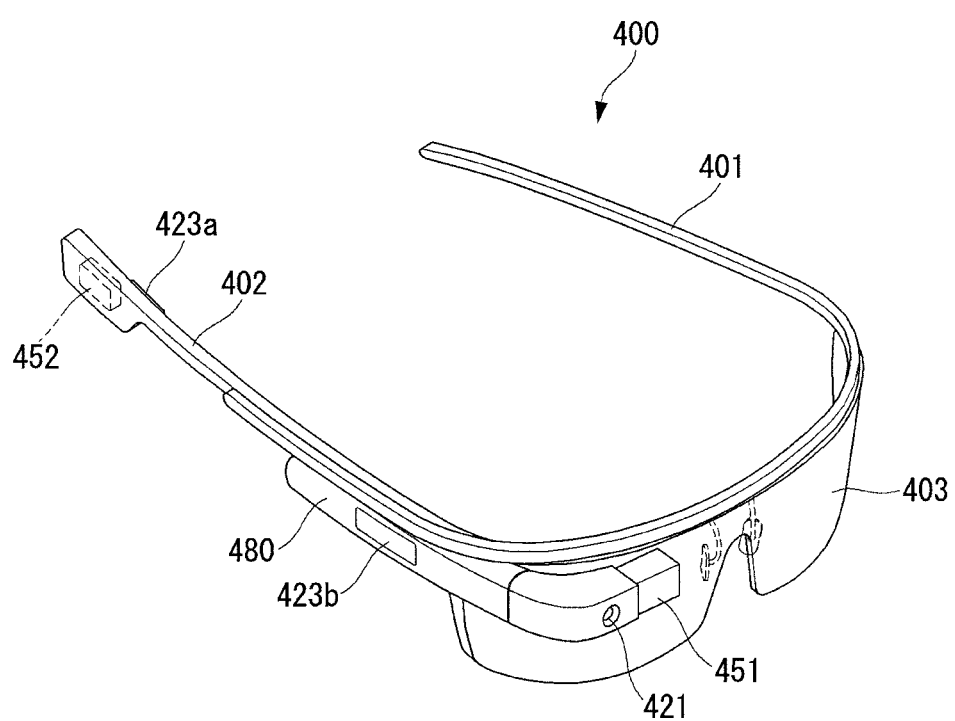
FIG. 2 illustrates a glasses type HMD according to an embodiment of the HMD shown in FIG. 1.

FIG. 2 is a perspective view illustrating one example of a glass-type HMD 400 according to another exemplary embodiment.

The glass-type HMD 400 can be wearable on a head of a human body and provided with a frame (case, housing, etc.) therefor. The frame may be made of a flexible material to be easily worn. The frame of HMD 400 is shown having a first frame 401 and a second frame 402, which can be made of the same or different materials. In general, HMD 400 may be configured to include features that are the same or similar to that of HMD 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the HMD 400. The control module 480 may be understood as a component corresponding to the aforementioned controller 180. FIG. 2 illustrates that the control module 480 is installed in the frame part on one side of the head, but other locations are possible.

Figure 4:
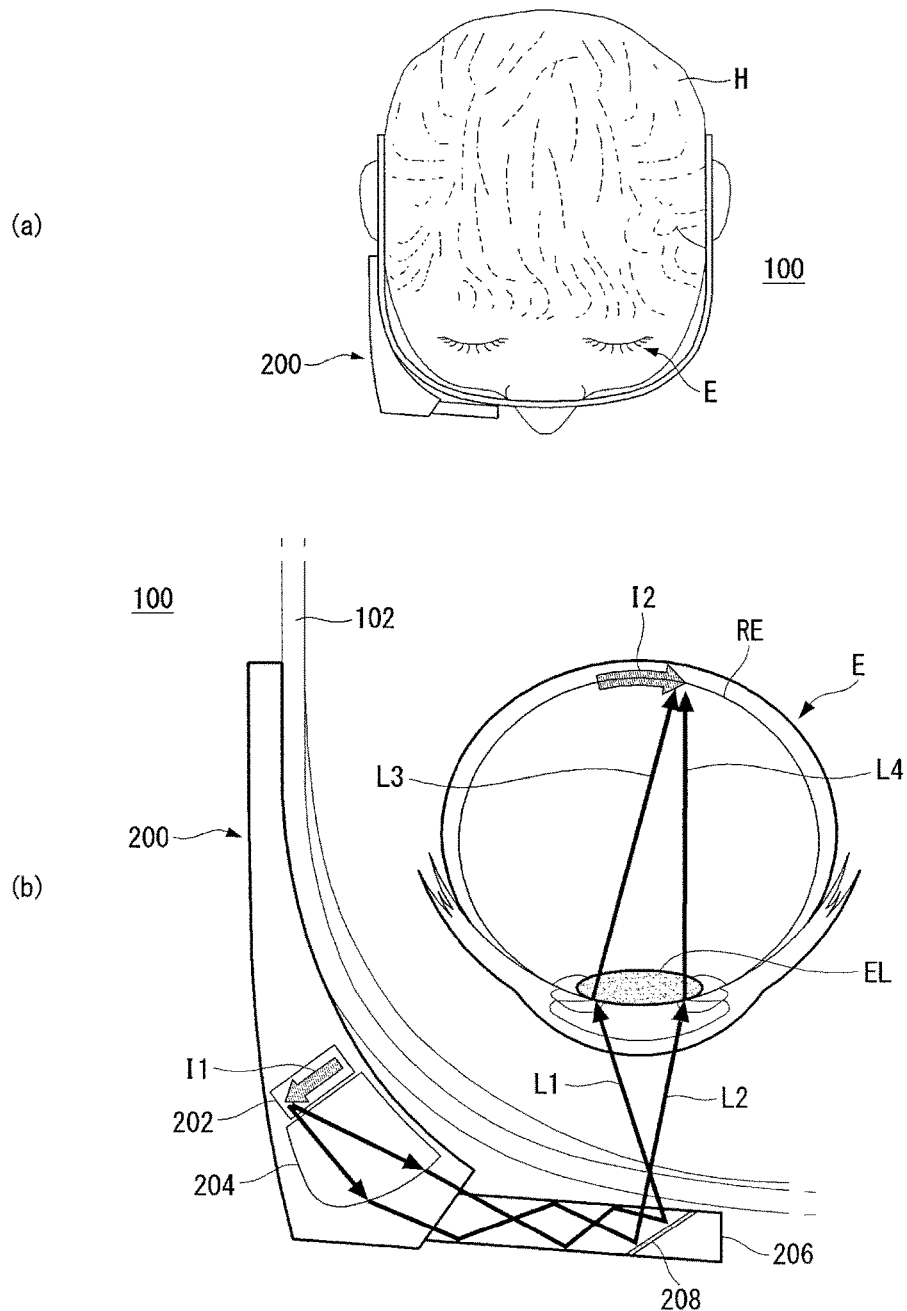
FIGS. 4 and 5 illustrate operation of the HMD shown in FIG. 1.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type HMD 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The HMD 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing.

The camera 421 may be positioned at most any location of the HMD. In some embodiments, multiple cameras 421 may be utilized. Such multiple cameras 421 may be used to acquire a stereoscopic image.

The glass-type HMD 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, HMD 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the HMD 400 and vibrate the user's skull to transfer sounds.

The location information module 115 is generally configured to detect, calculate, or otherwise identify a position of the HMD. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the HMD.

A typical GPS module 115 can measure an accurate time and distance from three or more satellites, and accurately calculate a current location of the HMD according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module can acquire speed information in real time to calculate a current position. Sometimes, accuracy of a measured position may be compromised when the HMD is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the HMD 100. This technology typically includes the use of a Wi-Fi module in the HMD 100 and a wireless access point for communicating with the Wi-Fi module.

The Wi-Fi positioning system may include a Wi-Fi location determination server, a HMD, a wireless access point (AP) connected to the HMD, and a database stored with wireless AP information.

The HMD connected to the wireless AP may transmit a location information request message to the Wi-Fi location determination server.

The Wi-Fi location determination server extracts the information of the wireless AP connected to the HMD 100, based on the location information request message (or signal) of the HMD 100. The information of the wireless AP may be transmitted to the Wi-Fi location determination server through the HMD 100, or may be transmitted to the Wi-Fi location determination server from the wireless AP.

The information of the wireless AP extracted based on the location information request message of the HMD 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the HMD 100 as described above, and may extract wireless AP information corresponding to the wireless AP connected to the HMD from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the HMD 100 using at least one wireless AP information extracted from the database.

A method for extracting (analyzing) location information of the HMD 100 may include a Cell-ID method, a fingerprint method, a trigonometry method, a landmark method, and the like.

The Cell-ID method is used to determine a position of a wireless AP having the largest signal strength, among peripheral wireless AP information collected by a HMD, as a position of the HMD. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a HMD using the signal strength information transmitted from the HMD based on the collected information. In order to use the fingerprint method, it is common for the characteristics of radio signals to be pre-stored in the form of a database.

The trigonometry method is used to calculate a position of a HMD based on a distance between coordinates of at least three wireless APs and the HMD. In order to measure the distance between the HMD and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a HMD using a known landmark transmitter.

In addition to these position location methods, various algorithms may be used to extract (analyze) location information of a HMD.

Such extracted location information may be transmitted to the HMD 100 through the Wi-Fi location determination server, thereby acquiring location information of the HMD 100.

The HMD 100 can acquire location information by being connected to at least one wireless AP. The number of wireless APs required to acquire location information of the HMD 100 may be variously changed according to a wireless communication environment within which the HMD 100 is positioned.

Further preferred embodiments will be described in more detail with reference to additional drawing figures. It is understood by those skilled in the art that the present features can be embodied in several forms without departing from the characteristics thereof.

Figure 3:
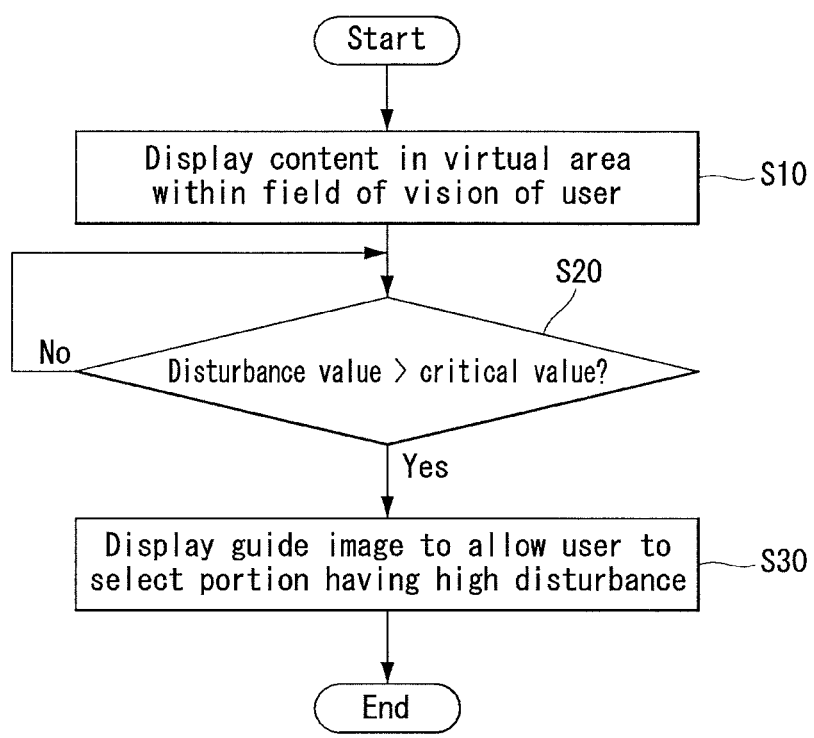
FIG. 3 is a flowchart illustrating operation of the HMD shown in FIG. 1.

FIG. 3 is a flowchart illustrating operation of the HMD shown in FIG. 1.

As shown, the controller 180 of the HMD 100 according to an embodiment of the present invention can perform step S10 of displaying content in a virtual area within the field of vision of a user.

The content may have various forms such as visual information and/or aural information. For example, the content can be a video clip including sound, a video clip including no sound, a still image including sound, a still image including no sound, a document including sound, a document including no sound, content including only sound, or the like.

The content may be provided to the user through the HMD 100. For example, various types of content can be provided to the user through the glasses type HMD 100.

If the user wears the HMD 100, the content can be provided in various manners irrespective of place and/or the posture of the user. This can be a difference from a conventional mobile terminal used by being gripped by a hand of a user. That is, a conventional mobile terminal used by being gripped by a hand of a user can effectively provide content only when the user looks at the display of the mobile terminal. Accordingly, the mobile terminal may not effectively provide content according to situation and/or position of the user. On the other hand, the HMD 100 has the advantage of effectively providing content because the user wears the glasses type HMD 100.

The content can be provided within the field of vision of the user. The field of vision of the user may be a maximum range that can be viewed by the user. The field of vision of the user may be a range that can be viewed by the user without turning the head. The field of vision of the user may be changed as the user moves his or her head.

The content may be displayed in a virtual area. The content may be displayed in a virtual area within the field of vision of the user. The content may be displayed in a specific point and/or region within the field of vision according to operation of the HMD 100 worn by the user. That is, the content may appear to be displayed at the point and/or region although the content is not actually displayed thereat. The virtual area may refer to a point and/or region at which the content appears to be displayed.

Step S20 of determining whether a disturbance value exceeds a critical value may be performed.

The disturbance value may be a degree of disturbance applied to the user who virtually and/or aurally recognizes the content. For example, an entity corresponding to the background of the virtual area in which the content is displayed may change during display of the content in the virtual area. This case can be easily understood when a case in which a user views content using the surface of a wall as a virtual area is assumed. That is, the user may view the content using the surface of the wall as a virtual area. The surface of the wall may be suited to viewing of the content because it has a uniform color usually white. In this situation, a person may suddenly pass in front of the surface of the wall. In this case, the color, contrast and the like of the content may instantaneously change, and thus the content may not be clearly viewed. This state may be considered to be a disturbance value increase state.

When the disturbance value increases, viewing of the content may be disturbed. This can be applied to aural content as well as the aforementioned visual content. That is, when a person neighboring the user shouts while the user listens to aural content, listening to the aural content may be instantaneously disturbed.

The controller 180 may sense disturbance through a sensor. For example, the controller 180 can photograph the virtual area through a camera or measure a noise level through a microphone. The controller 180 can calculate a disturbance value on the basis of the sensed disturbance. The controller 180 can compare the calculated disturbance value with a predetermined critical value.

When the disturbance values exceed the critical value, step S30 of displaying a guide image through which the user can select a content portion having a high disturbance value can be performed.

When the disturbance value exceeds the critical value, the user can be considered to be disturbed in viewing the portion corresponding to the disturbance value. For example, if disturbance exceeding the critical value at time t continues for 3 seconds while the user views video content, the user cannot normally view the content for a period from t to t+3.

The controller 180 can display the guide image to rapidly move to the portion corresponding to the disturbance value. For example, the controller 180 can display a thumbnail image through which the portion that cannot be normally viewed is detected. The user can select the displayed thumbnail image to easily and rapidly search the specific portion of the content which cannot be normally viewed.

Figure 5:
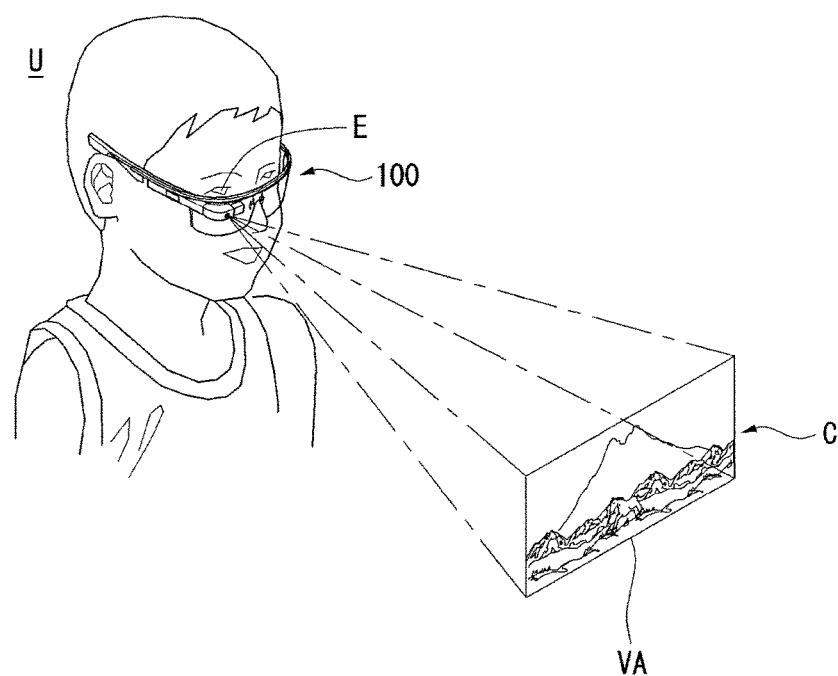

FIGS. 4 and 5 illustrate operation of the HMD shown in FIG. 1.

As shown, a first image I1 displayed on a display 202 included in the HMD 100 according to an embodiment of the present invention can be delivered to the eyes E of the user to obtain the effect of displaying content C in a virtual area VA within the field of vision of the user.

FIG. 4 illustrates the principle of imaging when a user wears the HMD 100 shown in FIG. 1.

As shown in FIG. 4(a), the HMD 100 may have a form of glasses worn on the head H of the user. The user can recognize an image generated through an image generator 200 of the HMD 100 through eyes E.

As shown in FIG. 3(b), light generated in the display 202 can be delivered to the user through a specific path.

The display 202 can display the first image I1. The first image I1 displayed on the display 202 may be an image to be delivered to the user from the image generator 200.

An optical lens 204 can change the optical path of the first image I1 displayed on the display 202. For example, the optical lens 204 can be configured as at least one concave lens and/or convex lens.

The optical lens 204 can be configured to form an optical path through which an image is focused on the retina RE of the eyes E of the user. That is, the optical lens 204 can be configured as a combination of at least one concave lens and/or convex lens in consideration of the eye lens EL of the user which serves as a convex lens such that light transmitted through the eye lens EL is focused on the retina RE.

A prism 206 can guide light refracted while passing through the optical lens 204 to a destination while reflecting the light at least once. The light input to the prism 206 through the optical lens 204 can reach a reflector 208 through a path through which light is total reflected inside the prism 206.

The reflector 208 can reflect the light traveling through the prism 206 to the eyeball E. The reflector 208 may be configured as a half mirror.

The light reflected from the reflector 208 can reach the eye lens EL through first and second optical paths L1 and L2. Considering the eye lens EL serving as a convex lens, the first and second optical paths L1 and L2 may have a divergent form. That is, the first and second optical paths L1 and L2 in a divergent form can be changed to third and fourth optical paths in a convergent form while passing through the eye lens EL. The convergent third and fourth optical paths L3 and L4 can be focused on the retina RE to form an image. That is, a second image I2 substantially the same as the first image I1 can be generated.

As shown in FIG. 5, the image focused on the retina RE of the user U can be displayed in the virtual area VA of the field of vision of the user U. That is, the effect that the content C appears in the virtual area VA although the content C is not actually displayed therein can be obtained.

Figure 6:
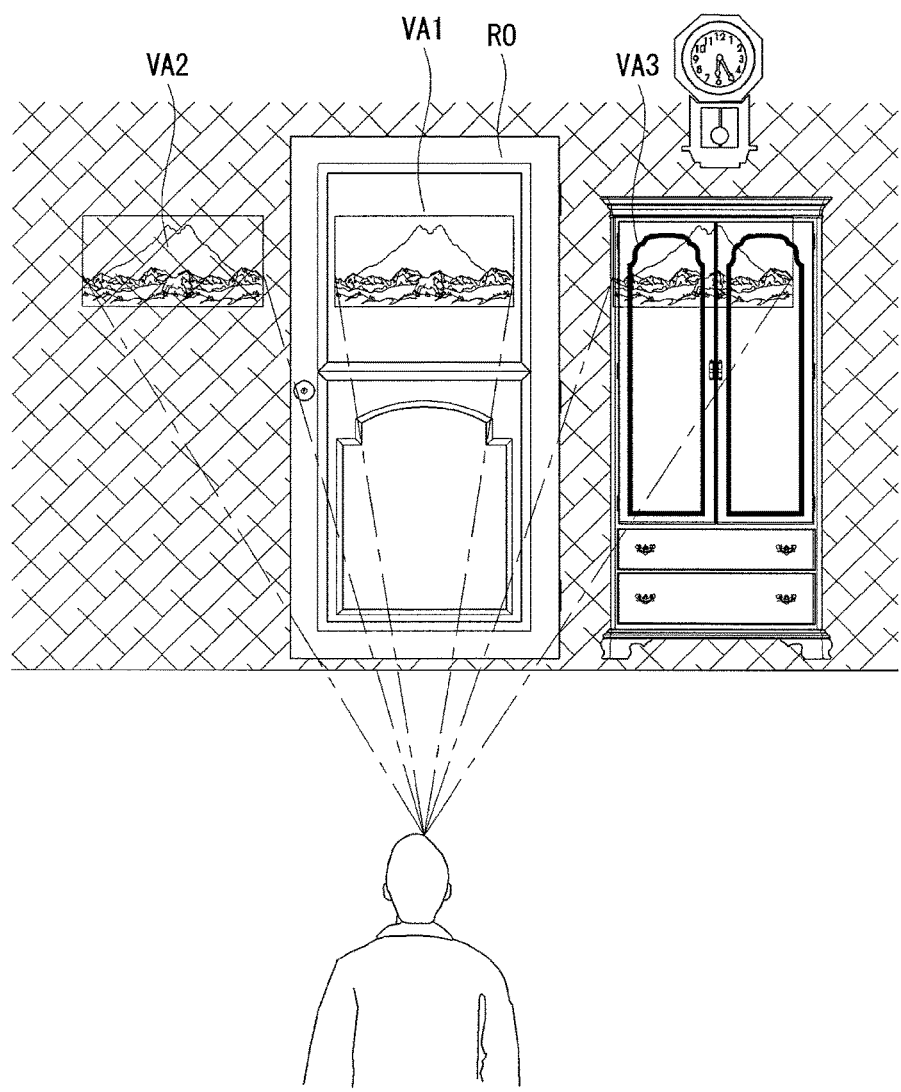
FIGS. 6 and 7 illustrate virtual area content display of the HMD shown in FIG. 1.
Figure 7:
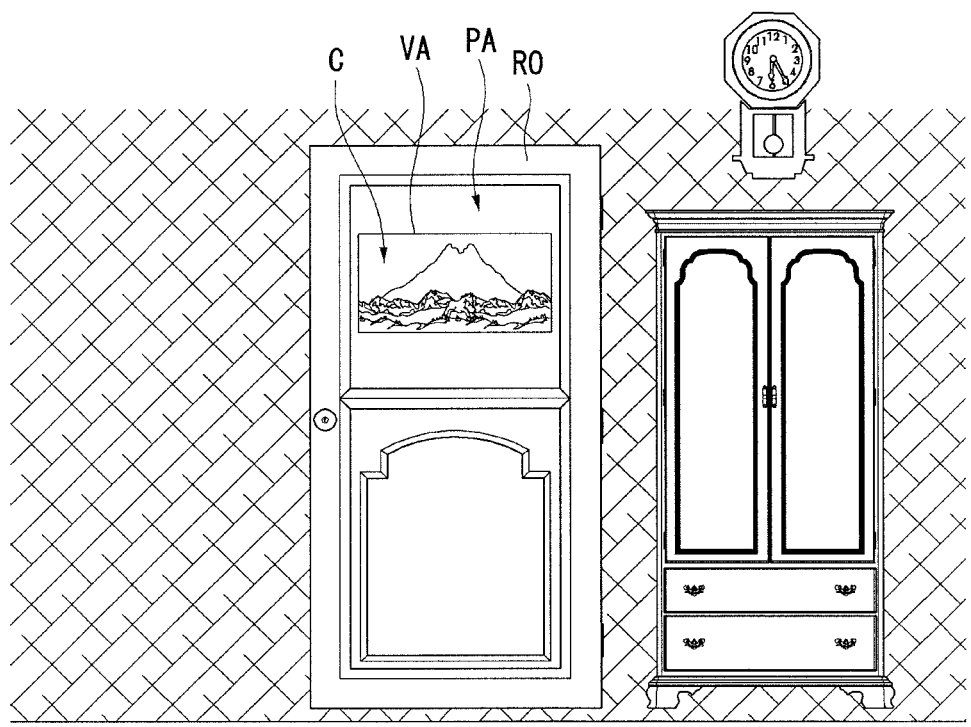

FIGS. 6 and 7 illustrate virtual area content display of the HMD shown in FIG. 1.

As shown, the HMD 100 according to an embodiment of the present invention can display the content C in a specific area.

Referring to FIG. 6, a plurality of virtual area candidates may be present within the field of vision of the user. For example, first, second and third virtual areas VA1, VA2 and VA3 can be present. The first virtual area VA1 may be an area corresponding to a door which is relatively flat and has a uniform color. The second virtual area VA2 may be an area corresponding to the surface of a wall which is flat but has many colors. The third virtual area VA3 may be an area which is not flat due to furniture arranged therein.

The controller 180 may select a virtual area in which content will be displayed from the virtual area candidates. For example, the controller 180 can select the first virtual area VA1 from which content can be clearly discriminated as a display area R0.

Referring to FIG. 7, the content C displayed in the selected display area R0 can be clearly recognized because the display area R0 is relatively flat and has a uniform color. That is, the display area R0 may be an area having lower disturbance than other areas. The controller 180 can set an optimal area PA which can display the content C more clearly in the selected display area R0 to a virtual area VA. For example, when a door is set to the display area R0, a flat part of the door, corresponding to the width of the optimal area PA, can be set to a virtual area VA.

FIGS. 8 to 11 illustrate virtual area setting within a field of vision according to the HMD shown in FIG. 1.

As shown, the HMD 100 according to an embodiment of the present invention can select a virtual area within the field of vision of the user.

Figure 8:
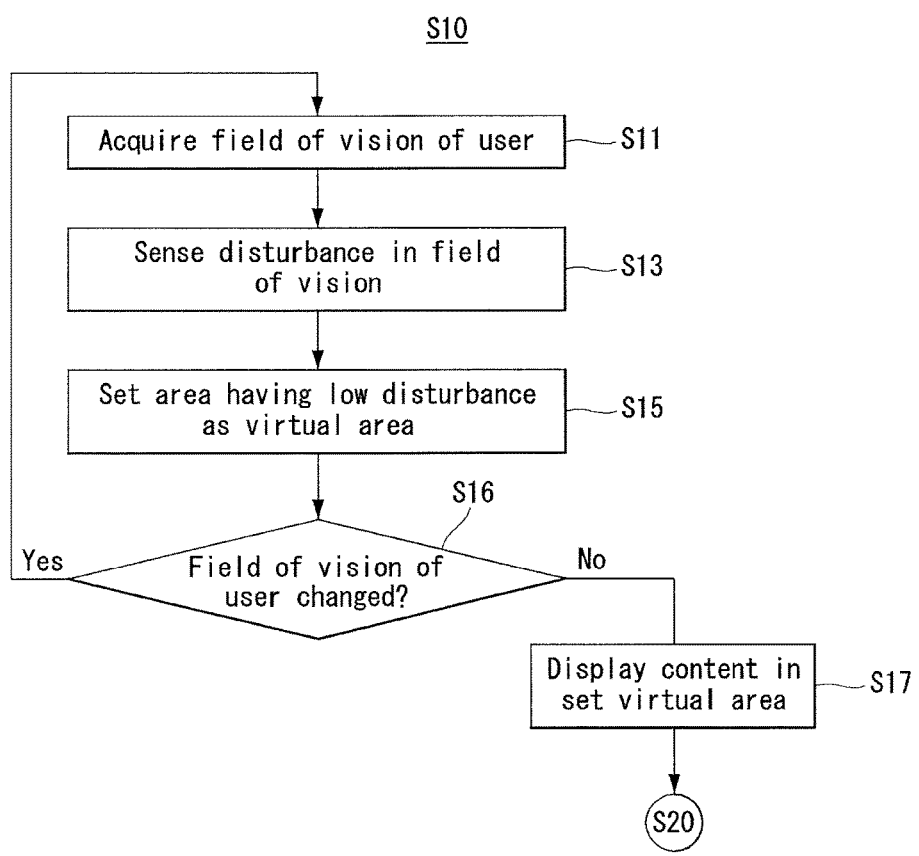
FIGS. 8 to 11 illustrate virtual area setting within a field of vision according to the HMD shown in FIG. 1.

As shown in FIG. 8, step S10 of displaying content of the HMD 100 according to embodiment of the present invention in a virtual area within the field of vision of the user may include step S11 of acquiring the field of vision of the user.

The field of vision of the user may be related to the direction of the head of the user. For example, the field of vision can be sensed or calculated on the basis of the direction of the face of the user. Accordingly, the field of vision can be acquired on the basis of an angle sensed through a geomagnetic sensor capable of sensing azimuth. Alternatively, the field of vision may be acquired through a camera which captures an image of the area in front of the user.

Subsequently, step S13 of detecting disturbance within the field of vision and step S15 of setting an area having low disturbance as a virtual area can be performed. The virtual area in which content will be displayed needs to be set as an area having low disturbance.

The controller 180 can determine an area suitable to display content within the acquired field of vision of the user. That is, the controller 180 can determine a virtual area suitable to display content within the current field of vision. The virtual area suitable to display content may be an area having a uniform color, an area having a uniform shape, or the like. The controller 180 can determine whether the color and shape of the virtual area are uniform on the basis of the image of the area in front of the user, captured by the camera 121.

Step S16 of determining whether the field of vision of the user has changed can be performed.

The HMD 100 is an electronic device worn on the head of a user. Accordingly, when the user turns the head, the field of vision of the user can change. Therefore, the controller 180 can continuously sense whether the field of vision of the user has changed using the camera and/or the geomagnetic sensor.

When the field of vision of the user has not changed, step S17 of displaying content in the set virtual area is performed. That is, the content can be displayed in the selected area having low disturbance.

Figure 9:
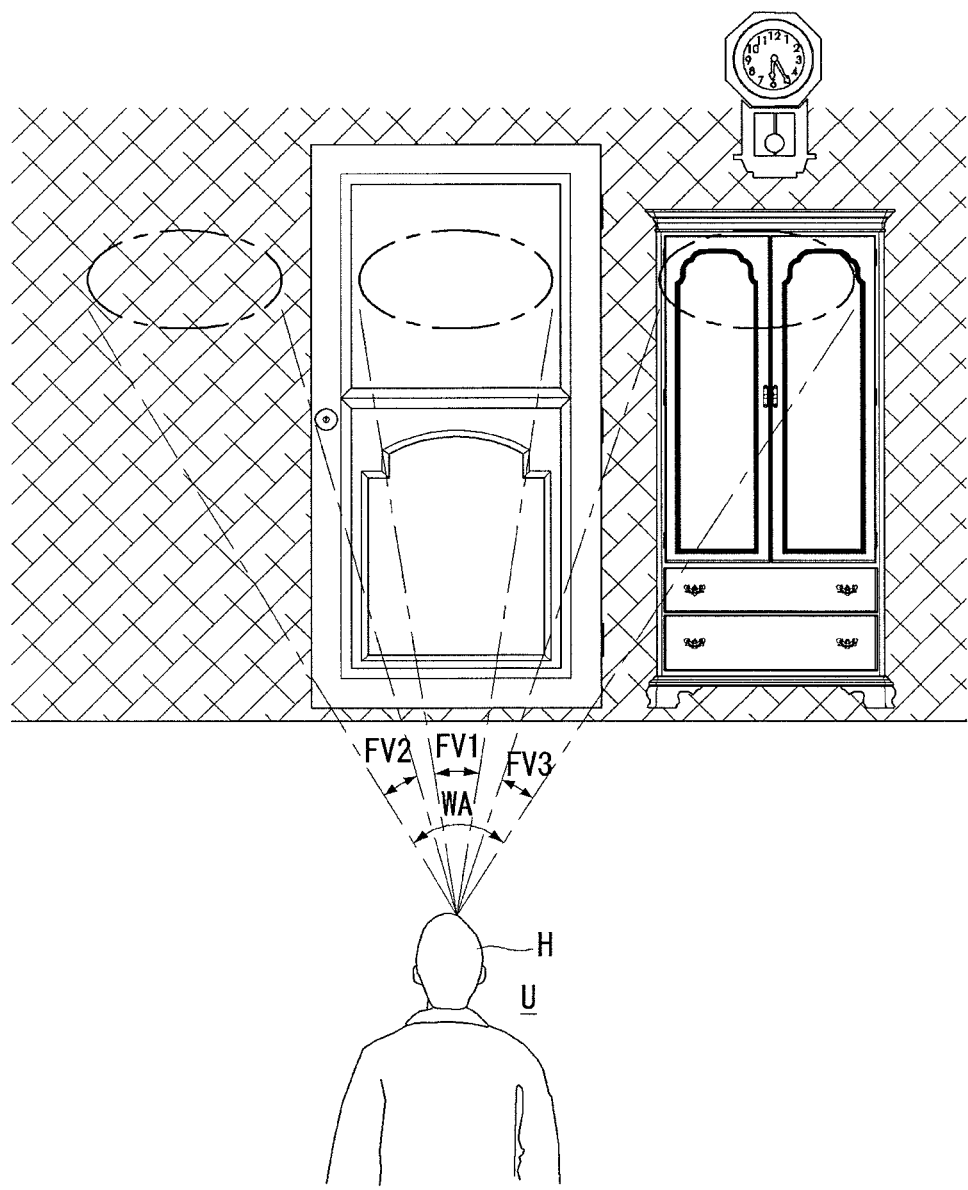

Referring to FIG. 9, the field of vision WA of the user U may be a specific area in front of the head H of the user U.

The controller 180 may divide the field of vision WA into a plurality of areas, for example, first, second and third areas FV1, FV2 and FV3. The controller 180 may select an area suitable to display the content from among the areas. For example, the controller 180 can select the first area FYI having relatively low disturbance from among the areas.

Figure 10:
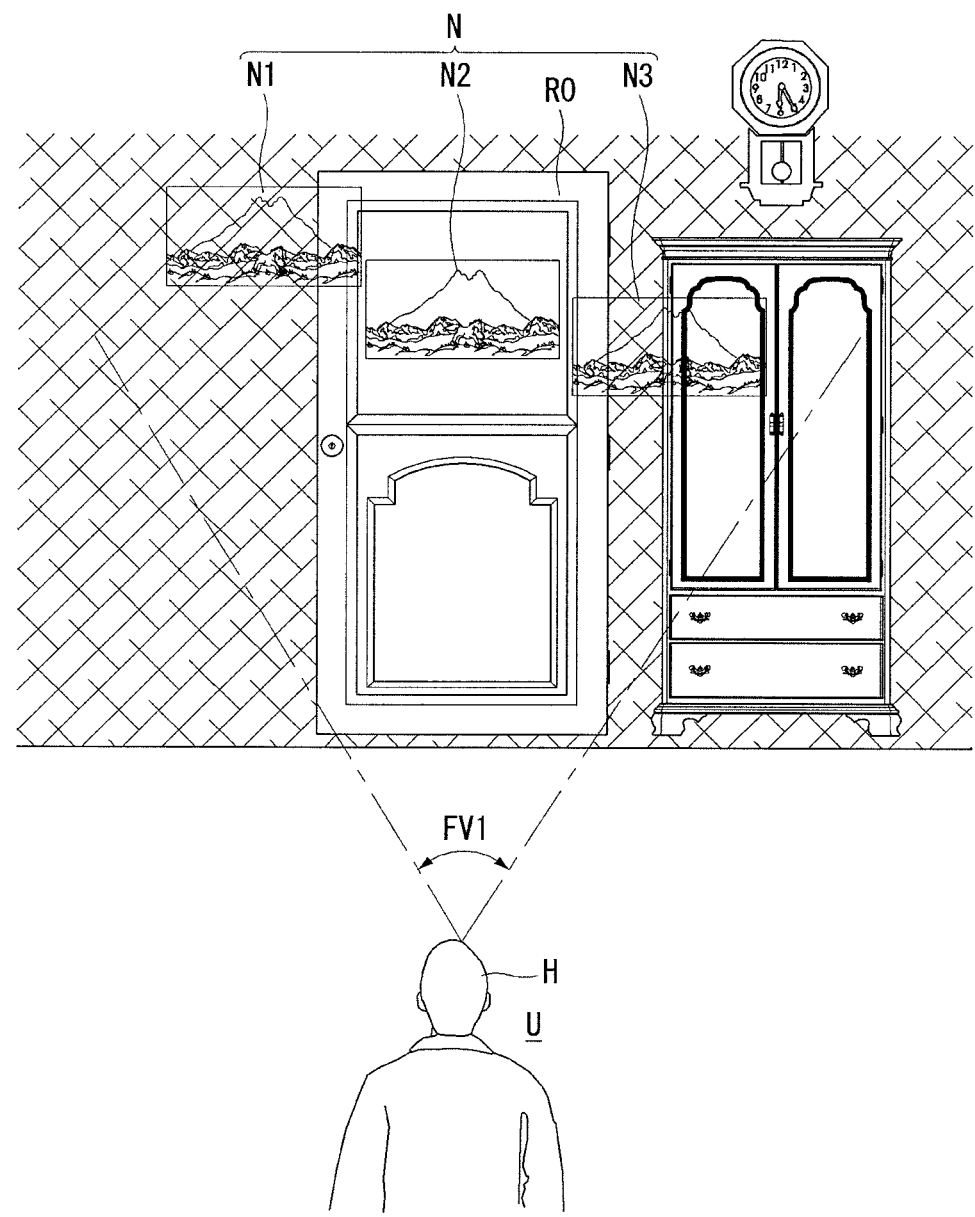

Referring to FIG. 10, the first area FV1 may include a plurality of candidate regions N for displaying content. For example, the first area FV1 can include first, second and third candidate regions N1, N2 and N3.

The controller 180 may set the second candidate region N2 suitable to display the content, from among the first, second and third candidate regions N1, N2 and N3, as the display area R0 and display the content in the display area R0.

Figure 11:
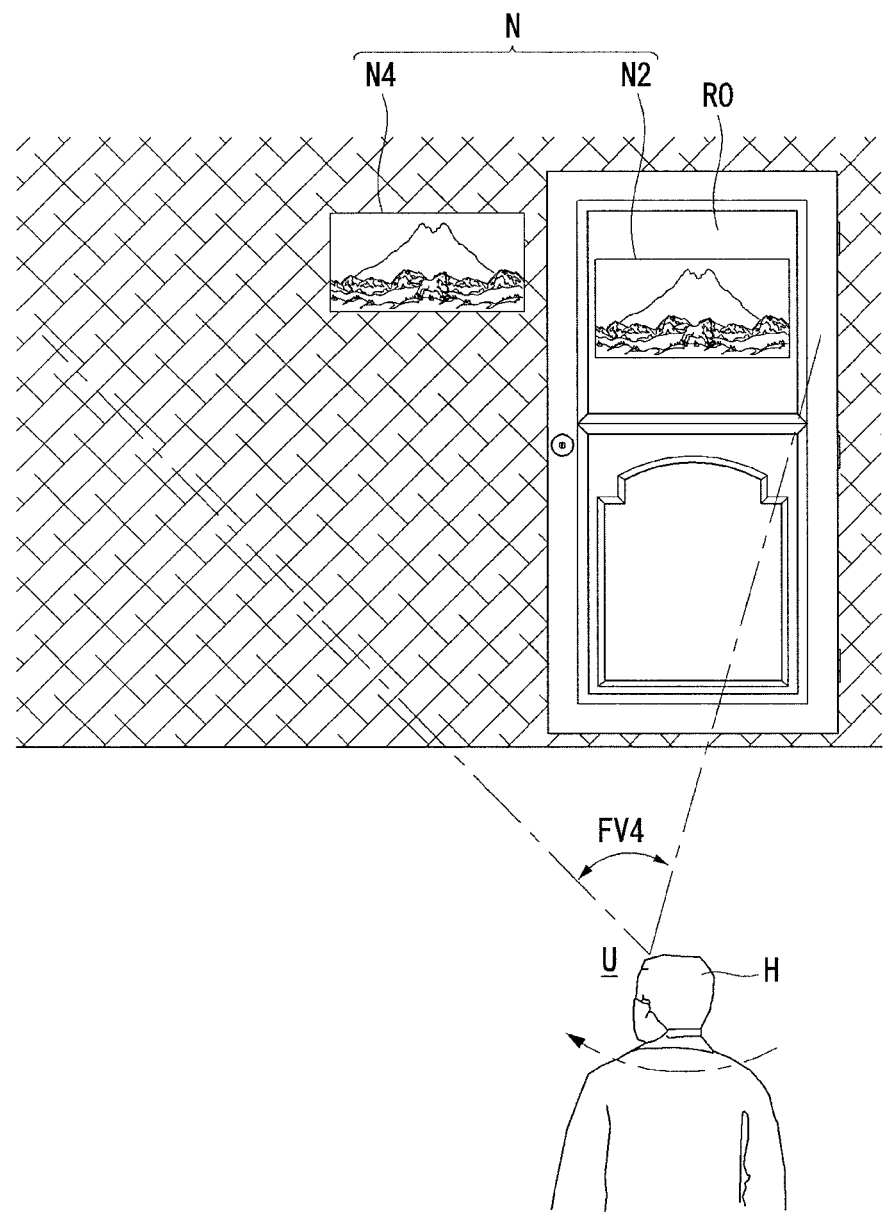

Referring to FIG. 11, the head H of the user may be turned. When the head H of the user is turned, the field of vision can change to a fourth area FV4. When the field of vision changes to the fourth area FV4, a fourth candidate region N4 can be added to the preset second candidate region N2. The controller 180 can compare the disturbance value of the added fourth candidate region N4 with the disturbance value of the preset second candidate region N2. Upon determining that the disturbance value of the fourth candidate region N4 is greater than that of the second candidate region N2, the controller 180 may maintain the second candidate region N2 as the display area R0.

FIGS. 12 to 17 illustrate disturbance during operation of the HMD shown in FIG. 1.

As shown, the controller 180 of the HMD 100 according to an embodiment of the present invention can easily and rapidly detect a portion of the content which is not correctly recognized due to disturbance generated during playback of the content.

Figure 12:
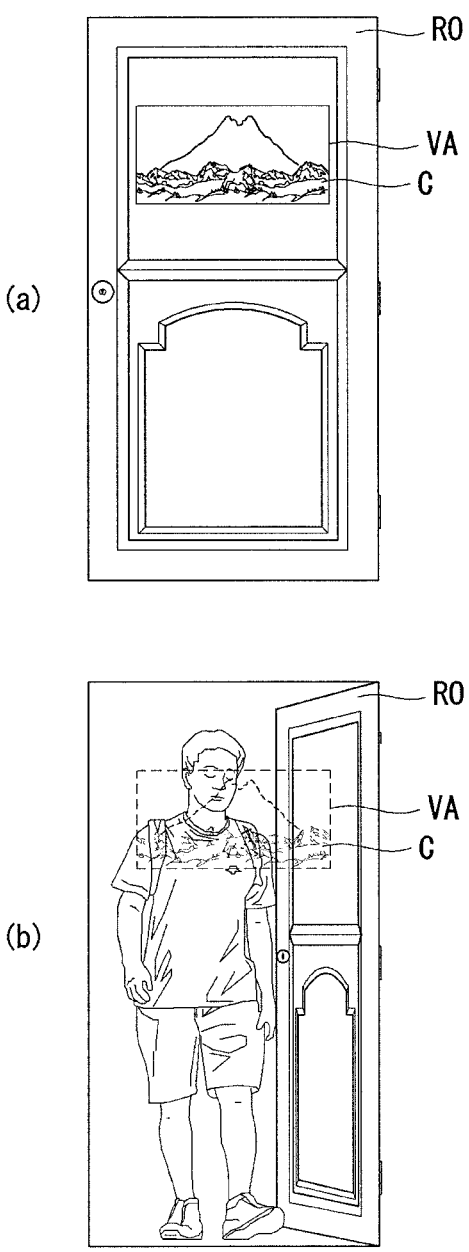
FIGS. 12 to 17 illustrate disturbance during operation of the HMD shown in FIG. 1.

Referring to FIG. 12(*a*), the controller 180 of the HMD 100 may set a display area R0 having low disturbance to a virtual area VA and display the content C in the virtual area VA. For example, the controller 1809 can display the content C using a door which is relatively flat and has a uniform color as a background.

Referring to FIG. 12(*b*), the door may be opened by a person. When the door is open, disturbance of the display area R0 may abruptly increase. For example, the background can change and the image of the person who opens the door and the virtual area VA can overlap due to door opening. Disturbance may increase due to background change and/or overlapping of the image of the person and the virtual area VA. That is, the user cannot correctly recognize the content C.

Figure 13:
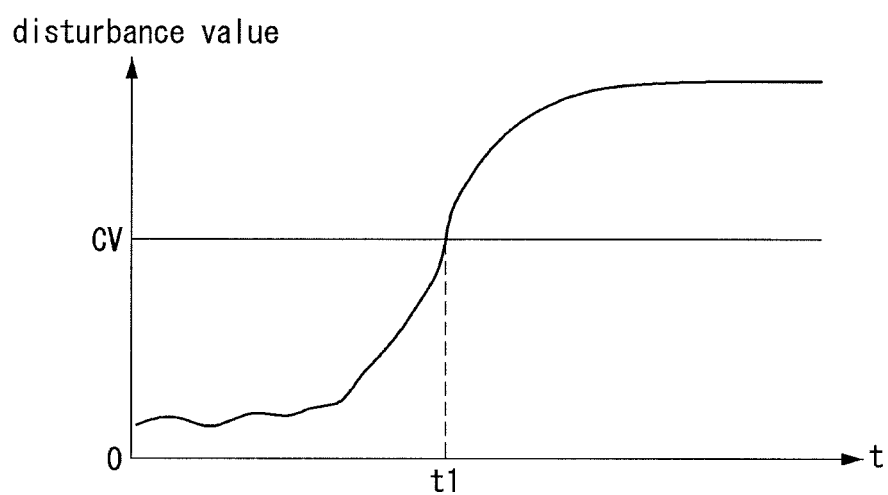

Referring to FIG. 13, the disturbance value may vary with time. For example, the disturbance value may be lower than the critical value CV before time t1. This means that the content is displayed in a stable virtual area VA such as a door.

The disturbance value may exceed the critical value CV at time t1. For example, an event of opening the door can be generated at t1. Due to door opening, the content C displayed in the virtual area VA may not be recognized by the user, and the controller 180 can calculate the disturbance value upon sensing this situation.

The disturbance value may be a degree of disturbance calculated by the controller 180. That is, the disturbance value can be calculated by the controller 180 on the basis of the current situation acquired through the camera 121 or the like.

Figure 14:
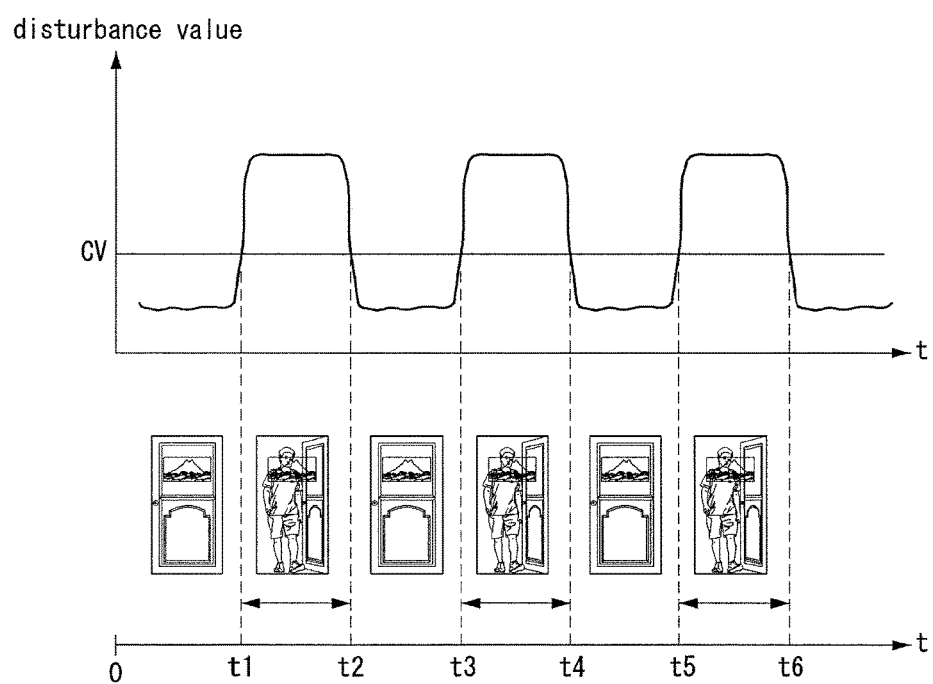

Referring to FIG. 14, the disturbance value may vary with time. This means that an event of opening and closing a door can be generated when the display area R0 is the door, for example. Disturbance may abruptly increase to exceed the critical value CV in a period from t1 to t2, a period from t3 to r4 and a period from t5 to t6.

In periods in which disturbance exceeds the critical value, the user may not clearly recognize the content C. That is, the user can recognize the content C depending on a disturbance level. For example, the user recognizes approximately 50% of the content C at t1 when the distance value exceeds the critical value CV and does not recognize the content C at (t2−t1)/2 when the disturbance value is much higher than the critical value CV.

Figure 15:
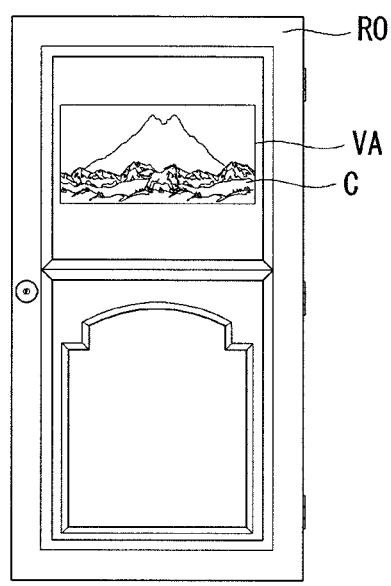
Figure 15:
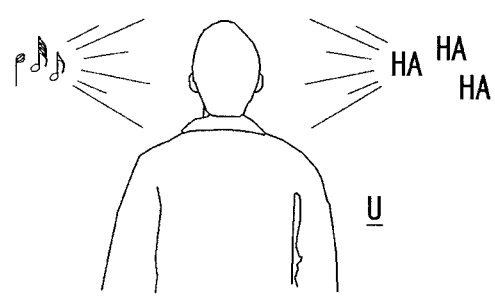

Referring to FIG. 15, aural disturbance may be generated. The content C may include sound content played back through a speaker of the HMD 100 along with visual content displayed in the virtual area VA corresponding to the display area R0. When noise is generated during playback of sound through the speaker of the HMD 100, a degree of sound recognition may decrease. The controller 180 can calculate a disturbance value on the basis of a noise level acquired through a sensor such as a microphone.

Figure 16:
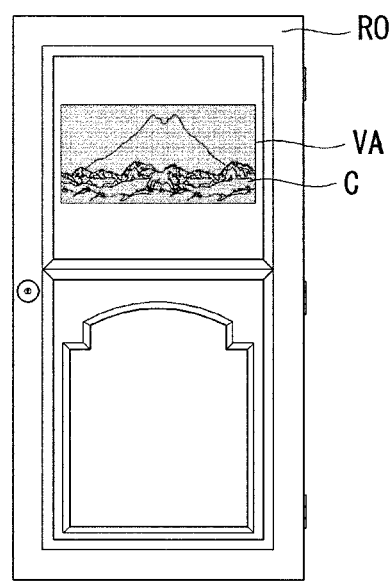
Figure 16:
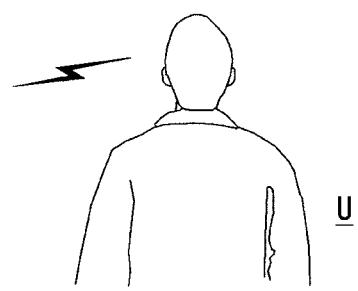

Referring to FIG. 16, disturbance due to a propagation environment may be generated. For example, when the content C played back through the HMD 100 has been received from the outside through the wireless communication unit 110 such as DMB, reception of radio waves may be disturbed at a specific time. When the content C is not normally displayed due to a problem with respect to radio wave reception, the controller 180 can handle this as disturbance. That is, the controller 180 can calculate a disturbance value on the basis of radio wave reception state.

Figure 17:
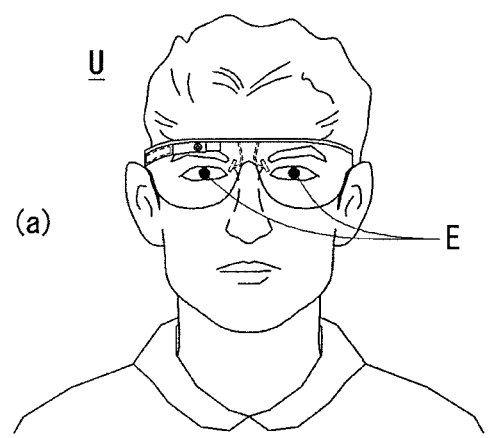
Figure 17:
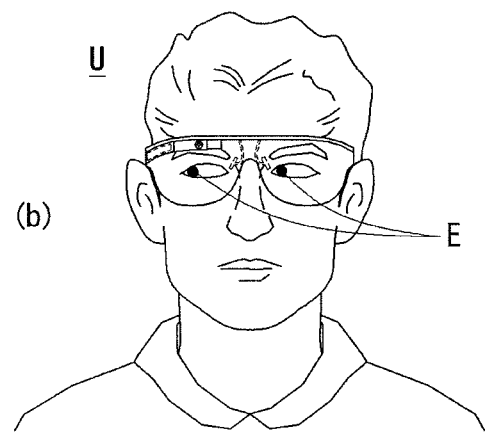

Referring to FIG. 17, the controller 180 may calculate a disturbance value on the basis of a degree of gaze of the user U at the content C.

Referring to FIG. 17(*a*), the user U may gaze at the displayed content C. The controller 180 may sense whether the user gazes at the virtual area VA in front of the eyes E of the user using a camera which photographs the eyes E.

Referring to FIG. 17(*b*), upon sensing that the eyes E of the user do not gaze the vertical area VA, the controller 180 can calculate a disturbance value by reflecting the sensed result in the disturbance value.

FIGS. 18 to 22 illustrate thumbnail display and corresponding content portion playback operations of the HMD shown in FIG. 1.

As shown, the controller 180 of the HMD 100 according to an embodiment of the present invention can provide thumbnail images TN through which a portion of played content can be easily and rapidly searched when the portion cannot be recognized by the user due to disturbance exceeding the critical value CV.

Figure 18:
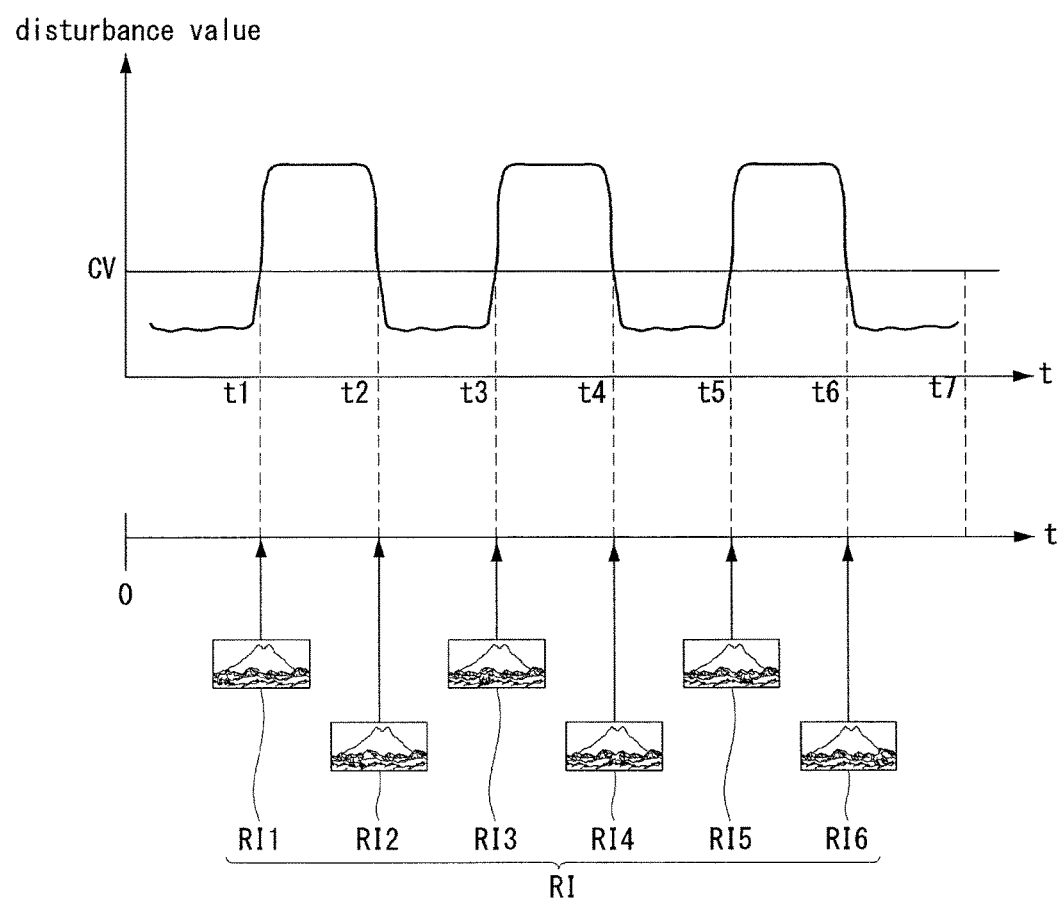
FIGS. 18 to 22 illustrate thumbnail display and corresponding content portion playback operations of the HMD shown in FIG. 1.

Referring to FIG. 18, the disturbance value may exceed the critical value CV in a period from t1 to t2, a period from t3 to t4 and a period from t5 to t6. Accordingly, the user may not correctly recognize part of or all content C being played back in the periods in which the disturbance value exceeds the critical value CV. For example, in the case of video content C, the user may not correctly recognize a first image R11 at time t1. Here, the user needs to rewind the content in the conventional system. In this case, the user may not immediately detect the missed portion of the content and thus requires a long time to perform the operation. The HMD 100 according to an embodiment of the present invention can provide thumbnail images TN of a portion of the content C which is determined to be missed to allow the user to search the portion of the content C more easily and rapidly.

Figure 19:
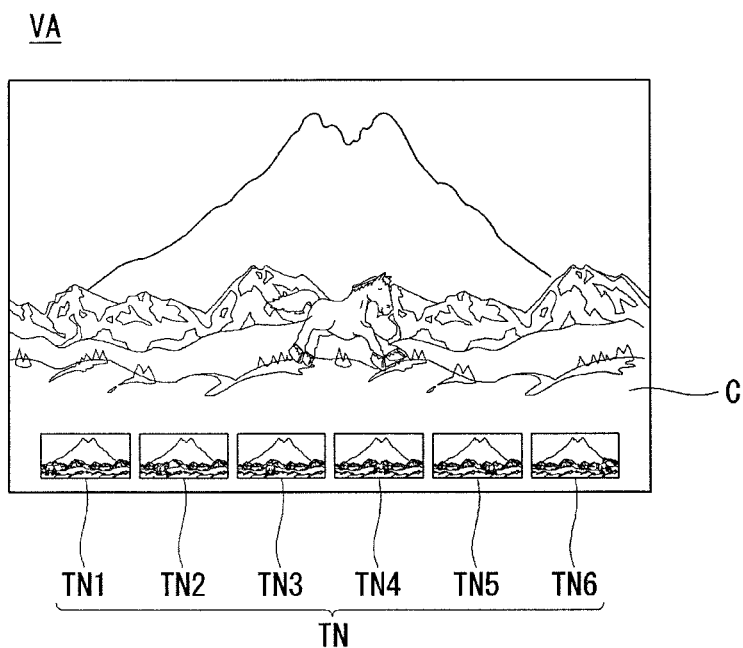
Figure 20:
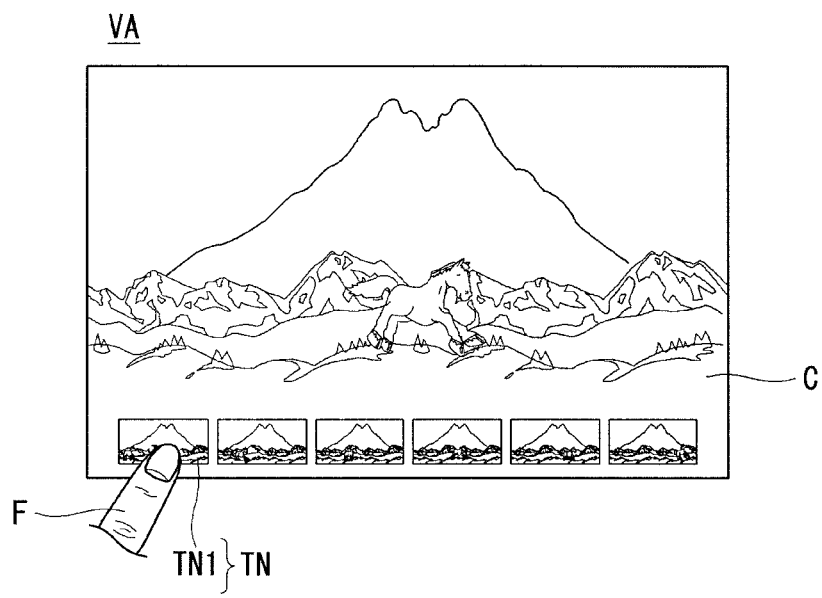
Figure 20:
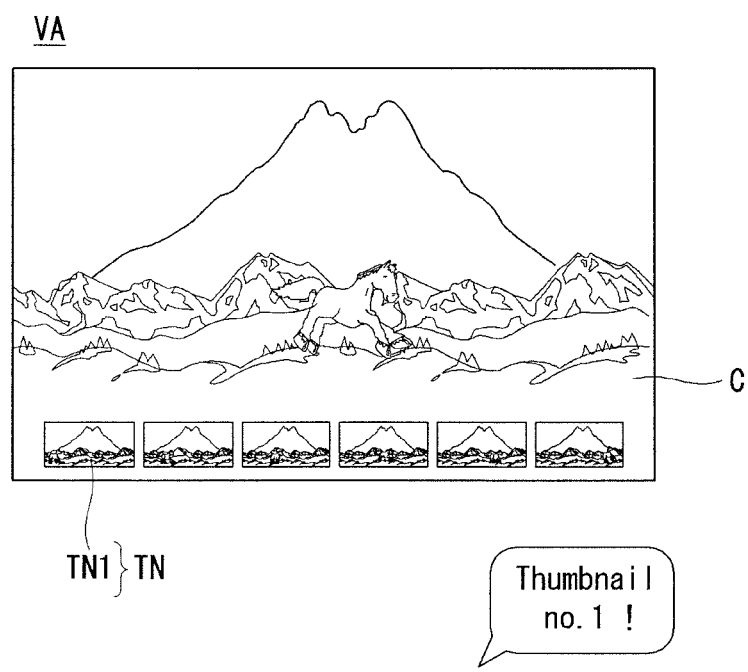

Referring to FIG. 19, the content C may be displayed in the virtual area VA. The controller 180 can display thumbnail images TN. The thumbnail images TN may correspond to a portion determined not to be viewed by the user due to disturbance increase. For example, the controller 180 can display thumbnail images TN of a portion of the content C, which is not recognized by the user due to opening of the door corresponding to the virtual area VA or noise generation.

Referring to FIG. 20(a), the user can select a thumbnail image TN corresponding to a specific portion of the content C that he or she wants to play back again using a hand H. Selection of the content portion using the hand H may be detected through the camera 121 which photographs the gesture of the user hand H. That is, selection of the specific thumbnail image TN can be determined on the basis of the position of thumbnail images TN displayed in the virtual area VA and the detected motion of the hand H in the 3D space.

Referring to FIG. 20(b), the specific thumbnail image TN may be selected on the basis of a voice command of the user. For example, when the user speaks "thumbnail number one", the first thumbnail image TN1 can be selected. The controller 180 can play back a portion of the content C which corresponds to the selected first thumbnail image TN1. Accordingly, the user can easily and rapidly search and view the missed portion of the content.

Figure 21:
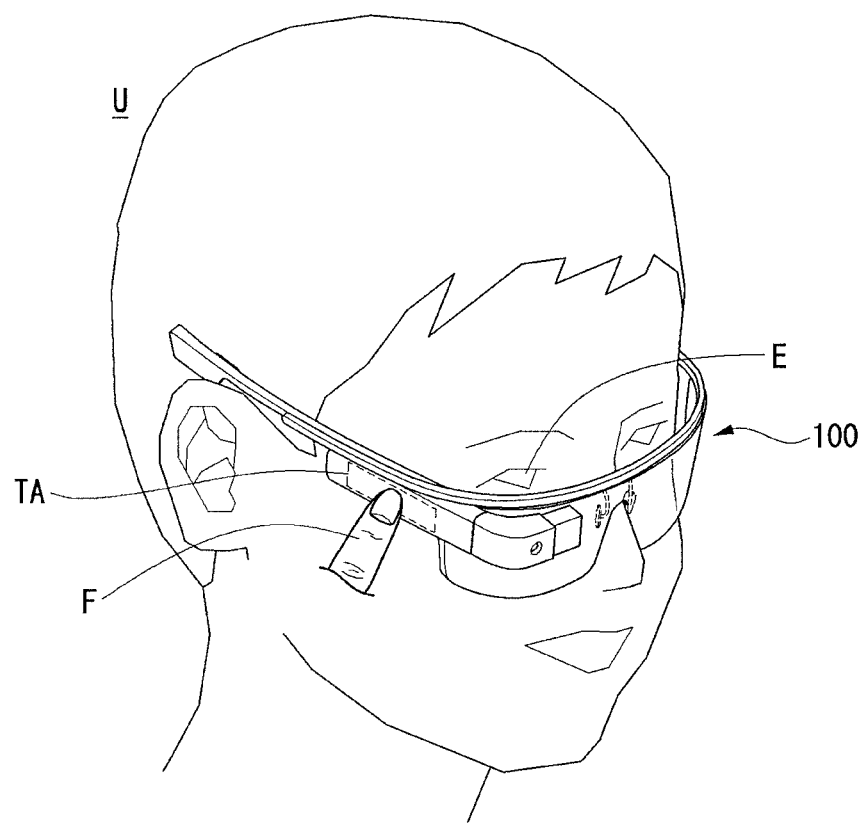

Referring to FIG. 21, the specific thumbnail image TN may be selected by operating a touchpad TA provided to the HMD 100. For example, the user can select the specific thumbnail image TN by touching the touchpad TA provided to the side of the HMD 100 with a finger F.

Figure 22:
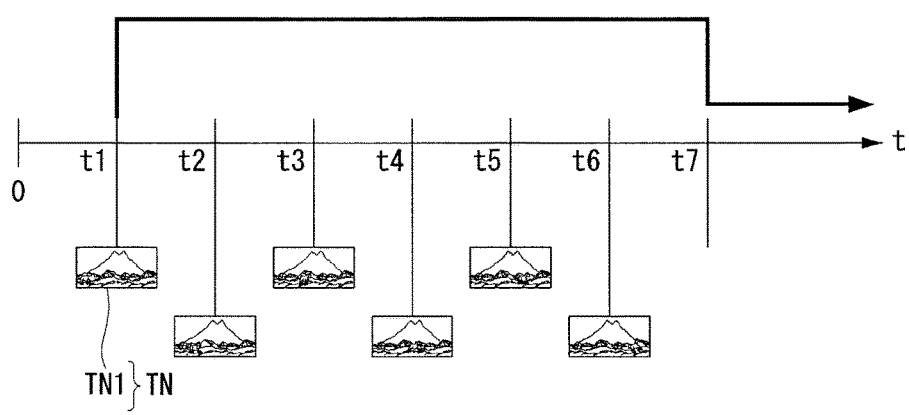

Referring to FIG. 22, the controller 180 may play back the portion of the content C which corresponds to the selected thumbnail image TN. For example, when the current time is t7, content C corresponding to the first thumbnail image TN1 can be played back at t7 upon selection of the first thumbnail image TN1.

The controller 180 may selectively play back the content C. That is, the controller 180 can play back only a specific section of the content C from the portion corresponding to the first thumbnail image TN1 or play back the content C from the portion corresponding to the first thumbnail image TN1 to the end. For example, if only a specific section of the content C is played back from the portion corresponding to the first thumbnail image TN1, only the portion corresponding to the period from t1 to t2 in which disturbance exceeds the critical value CV can be played back.

Figure 23:
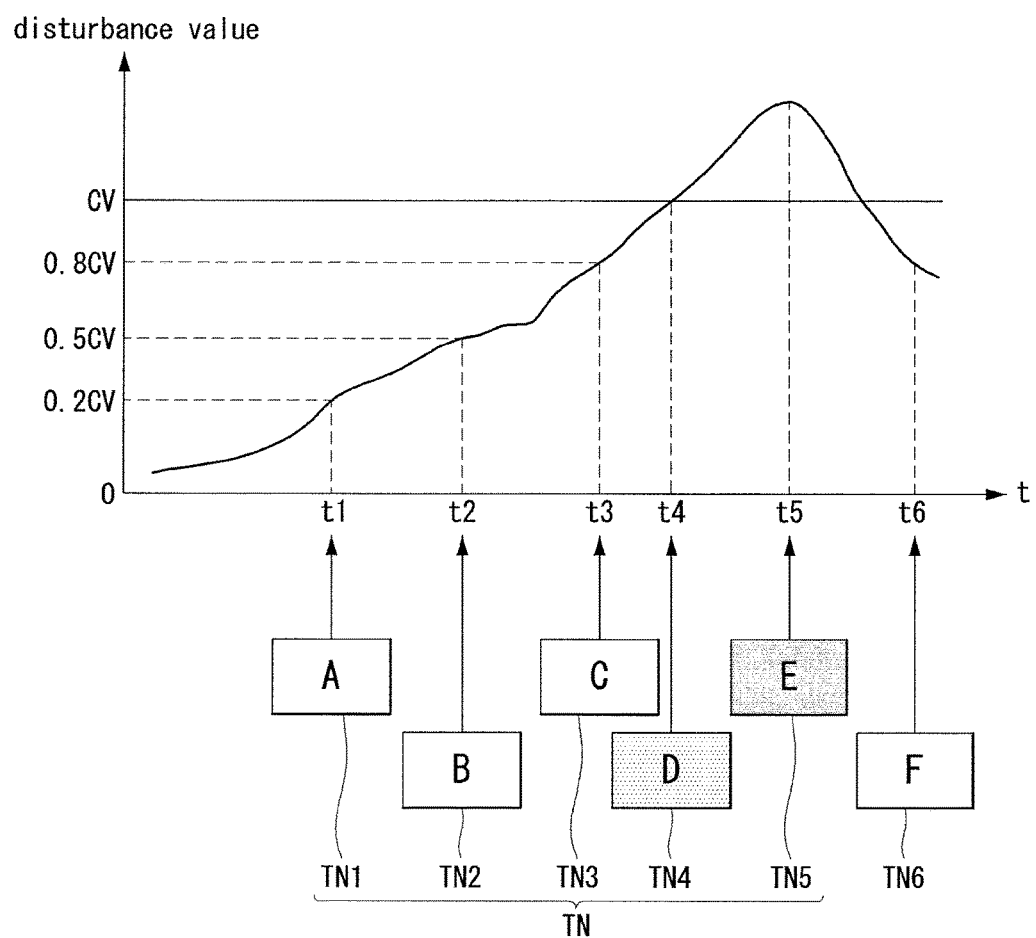
FIGS. 23 to 25 illustrate a thumbnail display method of the HMD shown in FIG. 1.
Figure 24:
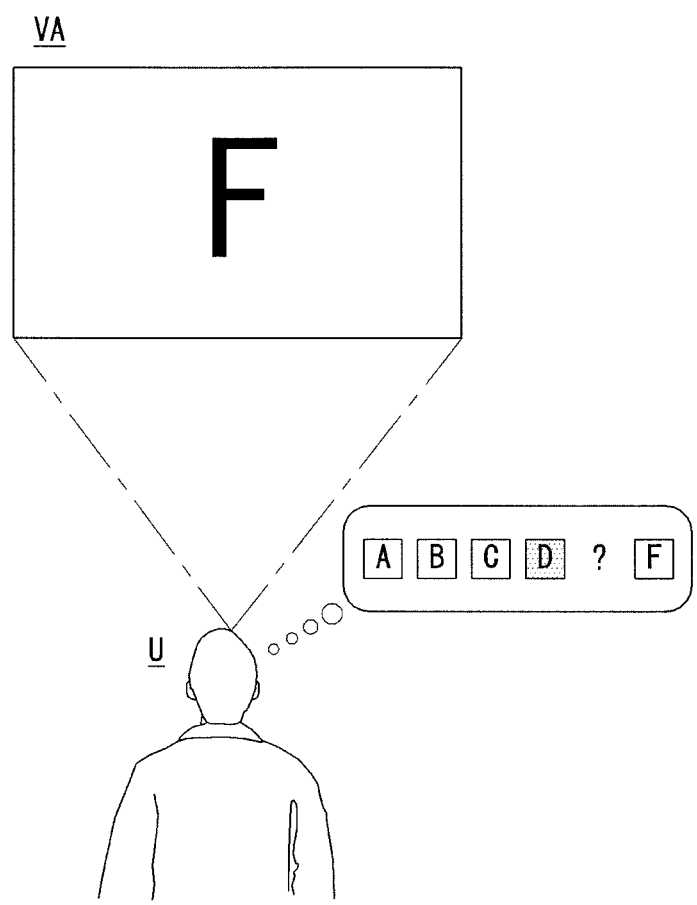
Figure 25:
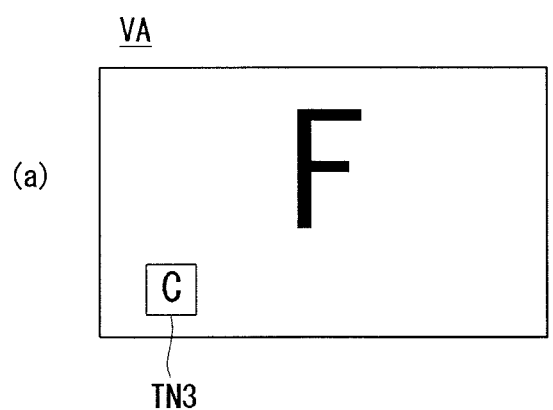
Figure 25:
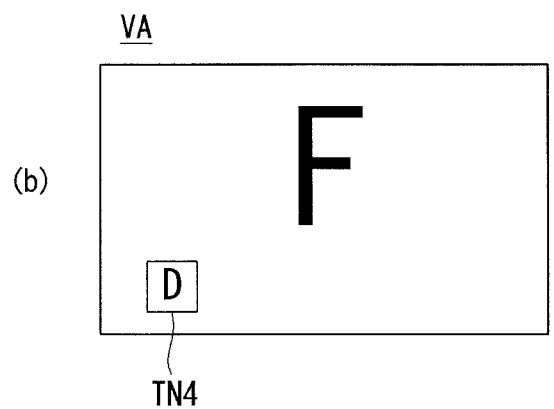

FIGS. 23 to 25 illustrate a thumbnail display method of the HMD shown in FIG. 1.

As shown, the controller 180 of the HMD 100 according to an embodiment of the present invention can select a thumbnail image TN to be displayed. That is, the controller 180 can provide the thumbnail image TN such that the user can determine that he or she has missed a specific portion of the content.

Referring to FIG. 23, disturbance may exceed the critical value CV at t4 and increases until t5. Accordingly, the user can clearly recognize the content C at t1, t2 and t3 respectively corresponding to 0.2, 05 and 0.8 times the critical value CV. The user may not clearly recognize the content C at t4 when the disturbance value exceeds the critical value CV. For example, when the user views a fourth thumbnail image TN4 corresponding to the portion of the content at t4, the user may or may not remember the portion. At t5 when the disturbance value is 1.3 times the critical value CV, the user may not recognize the portion of the content C corresponding to t5. That is, when the user views a fifth thumbnail image TN5 corresponding to the portion, the user may not remember the portion.

Referring to FIG. 24, at t6 corresponding to the current time, an image F included in the content C may be displayed in the virtual area VA. The user may not remember an image D corresponding to t4 although he or she remembers A corresponding to t1, B corresponding to t2 and C corresponding to t3. That is, since the disturbance value reaches the critical value CV at t4, the user may or may not view the displayed image D. As to an image E corresponding to t5, the user may not remember the image E because the disturbance value is much higher than the critical value CV at t5.

Referring to FIG. 25(a), the controller 180 may display the third thumbnail image TN3 corresponding to t3. That is, since the possibility that the user remembers the portion of the content C until t3 is high, the controller 180 can display the third thumbnail image TN3 corresponding to t3 to allow the user to easily detect the portion of the content C corresponding to t3.

Referring to FIG. 25(b), the controller 180 may display the fourth thumbnail image TN4 corresponding to t4. The fourth thumbnail image TN4 corresponds to the time when the disturbance value reaches the critical value CV as described above, and thus the user may or may not view the content portion corresponding to the fourth thumbnail image TN4. Accordingly, the user can view only the content portion missed due to disturbance in an optimized manner by selecting the displayed fourth thumbnail image TN4.

Figure 26:
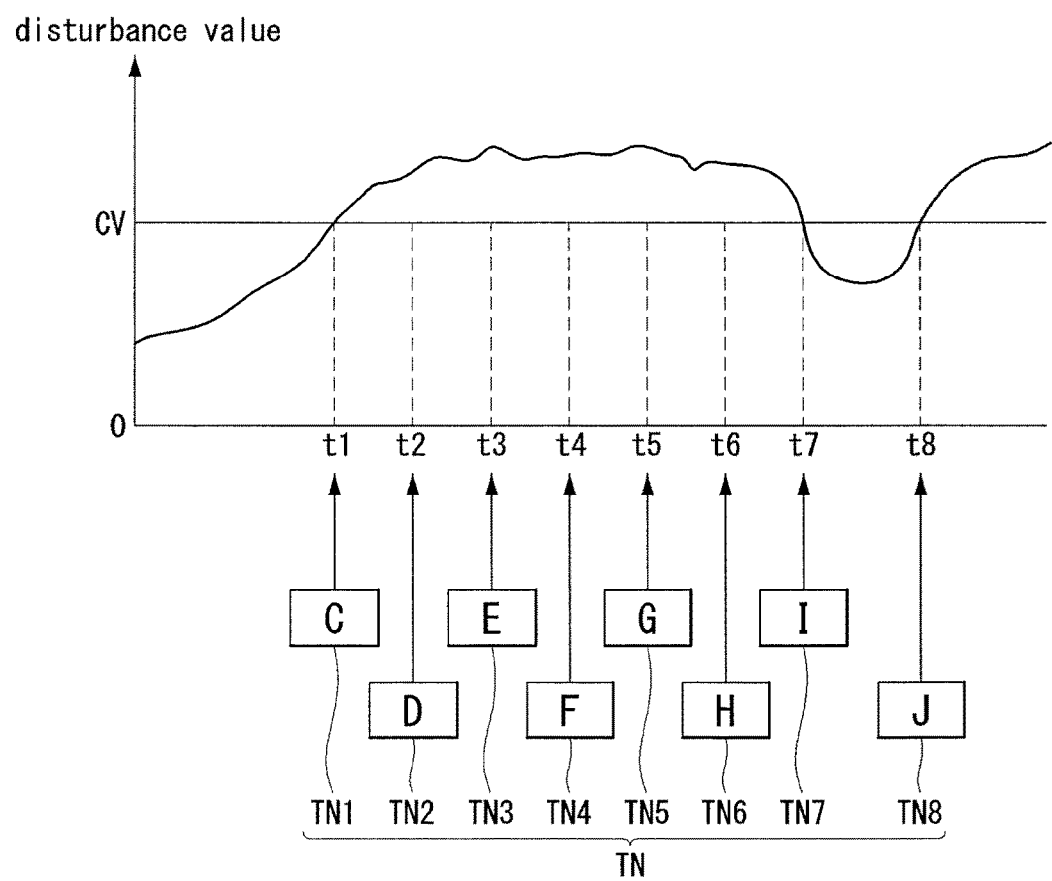
FIGS. 26 to 28 illustrate a representative thumbnail display method of the HMD shown in FIG. 1.
Figure 27:
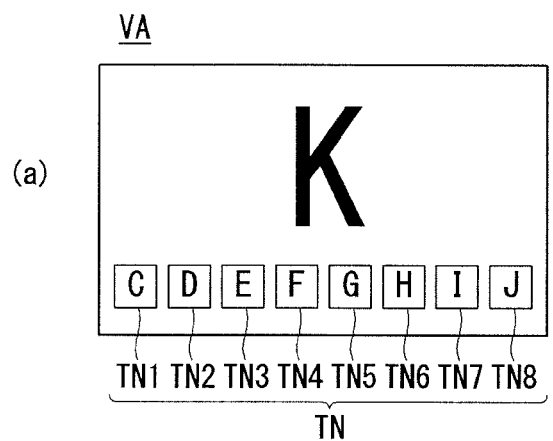
Figure 27:
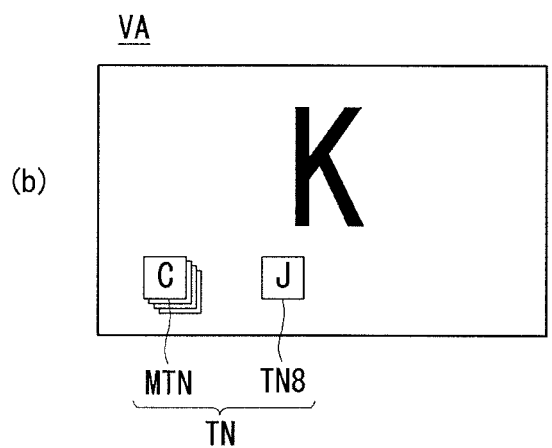
Figure 28:
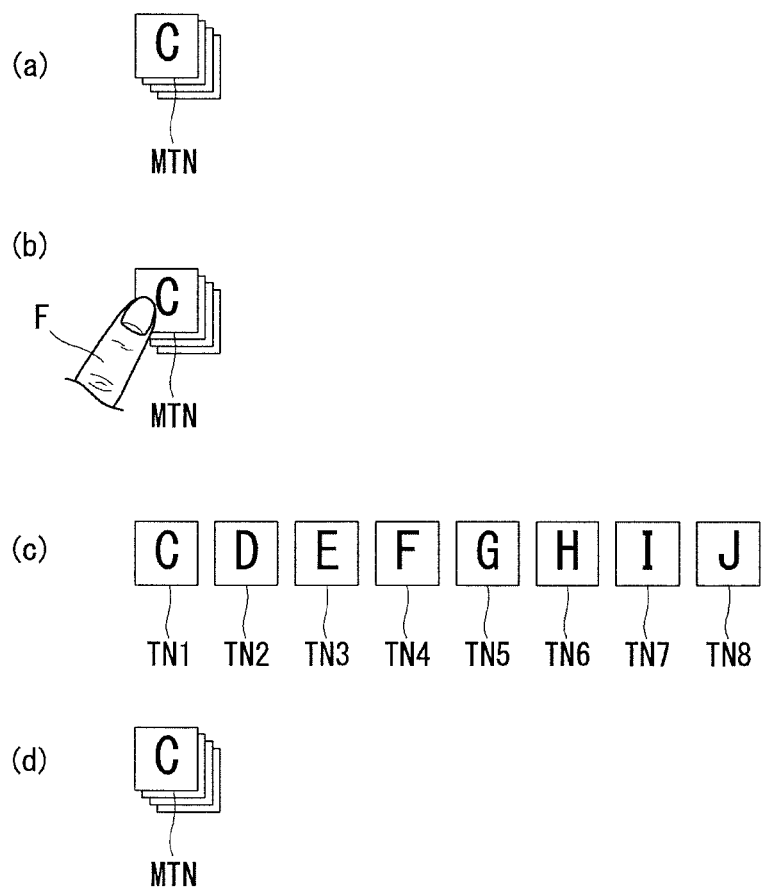

FIGS. 26 to 28 illustrate a representative thumbnail display method of the HMD shown in FIG. 1.

As shown, the HMD 100 according to an embodiment of the present invention can display a representative thumbnail MTN.

As shown in FIG. 26, the disturbance value may exceed the critical value CV in a period from t1 to t7. That is, the user may not recognize the content being played back for the period from t1 to t7. The current time is assumed to be after t8.

Referring to FIG. 27(a), the controller 180 may display first to eighth thumbnail images TN1 to TN8 at the current time. That is, the controller 180 can sequentially display thumbnail images TN corresponding to the period in which disturbance exceeds the critical value CV.

Referring to FIG. 27(b), the controller 180 may display a representative thumbnail MTN at the current time. The representative thumbnail MTN may be a thumbnail representing thumbnail images corresponding to a specific period. For example, when the disturbance value is continuously high in the period from t1 to t7, as described above, the thumbnail image representing the period can be displayed. If all thumbnail images corresponding to the period in which disturbance is generated are displayed, the user may be confused about selection of a thumbnail image. Accordingly, the representative thumbnail MTN can be displayed in a period in which high disturbance continues to minimize confusion of the user and effectively provide information about a missed content portion.

Referring to FIG. 28(a), the representative thumbnail MTN may be displayed.

Referring to FIG. 28(b), the user can select the representative thumbnail MTN using a finger F.

Referring to FIG. 28(c), the controller 180 may display the first to seventh thumbnail images TN1 to TN7 with respect to the representative thumbnail MTN upon selection of the representative thumbnail MTN. Accordingly, the user can precisely select a content portion that he or she wants to view again.

Referring to FIG. 28(d), the controller 180 may display the representative thumbnail MTN after lapse of a predetermined time from display of the first to seventh thumbnail images TN1 to TN7 and/or after lapse of a predetermined time from display of the first to seventh thumbnail images TN1 to TN7 upon selection of the representative thumbnail MTN.

Figure 29:
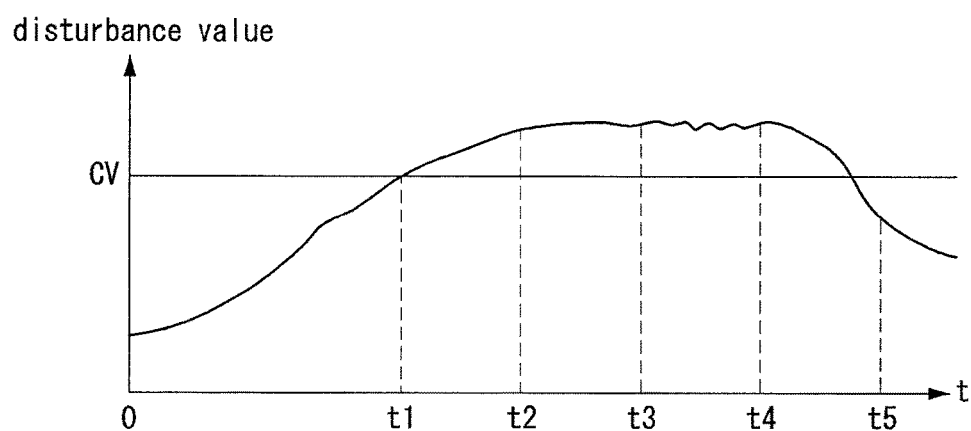
FIGS. 29 to 31 illustrate thumbnail display timing of the HMD shown in FIG. 1.
Figure 30:
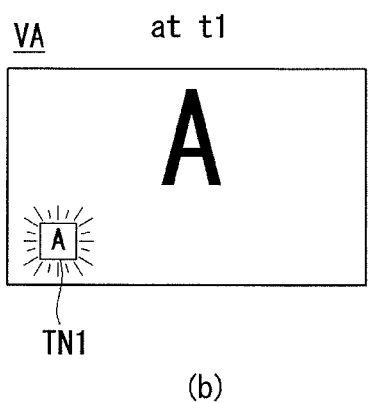
Figure 30:
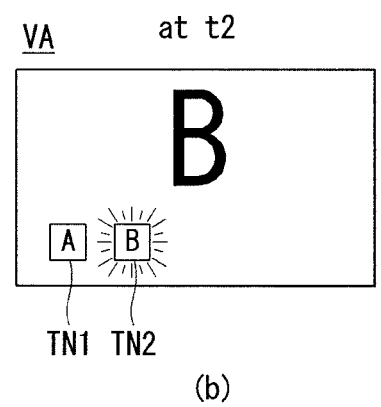
Figure 30:
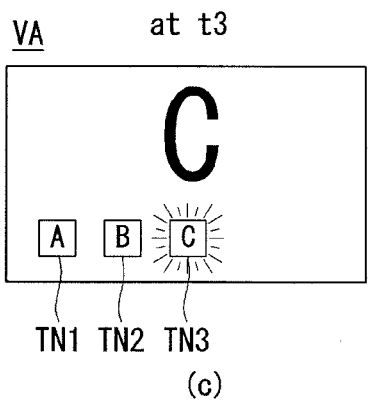
Figure 30:
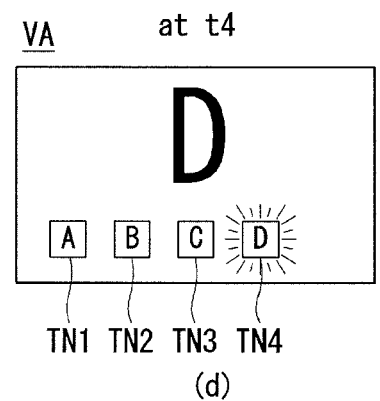
Figure 31:
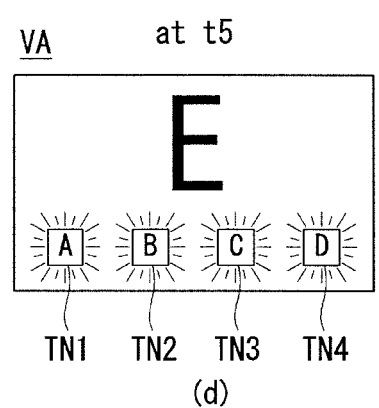

FIGS. 29 to 31 illustrate thumbnail display timing of the HMD shown in FIG. 1.

As shown, the controller 180 of the HMD 100 according to an embodiment of the present invention can effectively display a thumbnail image at various timings.

Referring to FIG. 29, disturbance may exceed the critical value CV in a period from t1 to t4.

Referring to FIG. 30(a), the controller 180 may display the first thumbnail image TN1 at t1. That is, the controller 180 can display the first thumbnail image TN1 when disturbance reaches the critical value CV.

Referring to FIGS. 30(b), 30(c) and 30(d), the controller 180 may sequentially display the second, third and fourth thumbnail images TN2, TN3 and TN4 at t2, t3 and t4. For example, the controller 180 can display thumbnail images at specific intervals when a state in which disturbance exceeds the critical value CV is maintained.

Referring to FIG. 31, the controller 180 may uniformly display thumbnail images when the state in which the disturbance value exceeds the critical value CV is ended. For example, the controller 180 can simultaneously display the first to fourth thumbnail images TN1 to TN4 at t5 when the user can normally view the content.

Figure 32:
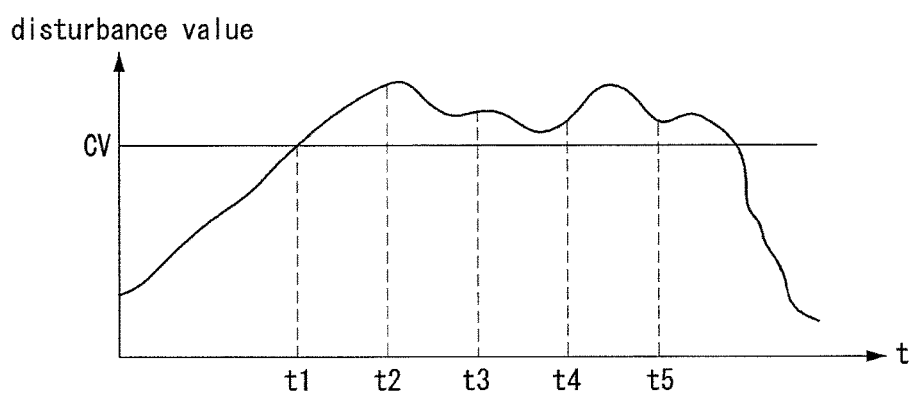
FIG. 32 illustrates thumbnail generation timing of the HMD shown in FIG. 1.
Figure 32:
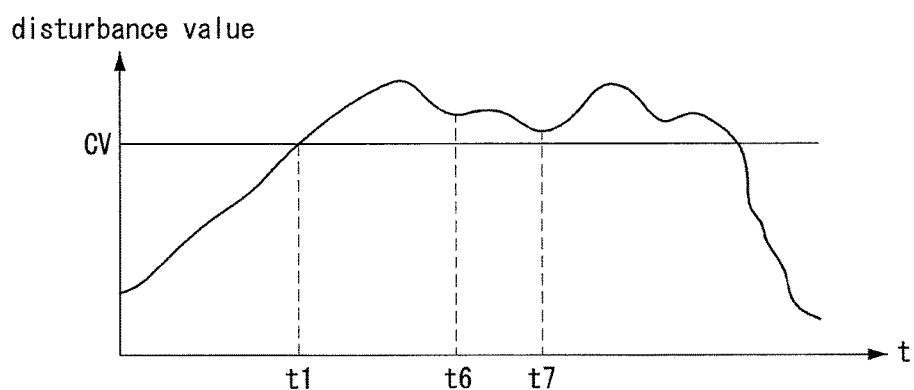

FIG. 32 illustrates thumbnail generation timing of the HMD shown in FIG. 1.

As shown, the controller 180 of the HMD 100 according to an embodiment of the present invention can generate thumbnail images through various methods.

Referring to FIG. 32(a), the controller 180 may generate thumbnail images corresponding to t2, t3, t4 and t5 at uniform intervals from t1 when disturbance reaches the critical value CV at t2, t3, t4 and t5.

Referring to FIG. 32(b), the controller 180 may generate a thumbnail image of a content portion at least part of which may be remembered by the user even at a time when disturbance exceeds the critical value CV. For example, the controller 180 can generate and display thumbnail images corresponding to t1, t6 and t7 at which a degree of disturbance is relatively low. Here, intervals of t1, t6 and t7 may be identical or different. When a thumbnail image corresponding to a time when a degree of disturbance is relatively low is displayed, the user can estimate a missed content portion through the displayed thumbnail.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. All changes and modifications that fall within the metes and bounds of the claims, or equivalents of such metes and bounds, are therefore intended to be embraced by the appended claims.

The invention claimed is:

1. A head mounted display comprising:
a display;
a sensor; and
a controller configured to:
display content displayed on the display in a virtual area within a field of vision of a user,
calculate a disturbance value based on a disturbance sensed by the sensor,
determine whether the disturbance value exceeds a critical value,
generate a first thumbnail image using an image of the content displayed at a time when the disturbance value exceeds the critical value,
display the first thumbnail image on a part of the virtual area while continuing to display the content, wherein the first thumbnail is first displayed in the virtual area when the disturbance value exceeds the critical value, and
play the content back again from the time in the virtual area in response to an input for selecting the displayed first thumbnail image, wherein the time corresponds to a time when the first thumbnail is generated.

2. The head mounted display according to claim 1, wherein the controller is configured to determine the disturbance value on the basis of at least one of a visual change of an area overlapping with the virtual area, change of an external noise generated during display of the content, change of a content reception state during display of the content, and change of a gaze direction of the user during display of the content.

3. The head mounted display according to claim 1, wherein the controller is configured to display at least one second thumbnail image corresponding to a period in which the disturbance value exceeds the critical value.

4. The head mounted display according to claim 3, wherein a plurality of second thumbnail images is displayed, and the controller is configured to generate and display the second thumbnail images at predetermined intervals or to generate and display the second thumbnail images when a difference between the disturbance value and the critical value is smaller than a predetermined value in the period in which the disturbance value exceeds the critical value.

5. The head mounted display according to claim 1, wherein the controller is configured to display the thumbnail image in the virtual area at a time of generation of the thumbnail image or to display the thumbnail image generated when the disturbance value becomes less than the critical value in the virtual area.

6. The head mounted display according to claim 1, wherein a plurality of thumbnail images is displayed, and the controller is configured to generate a representative thumbnail image representing the plurality of thumbnail images to display at least part of the plurality of thumbnail images.

7. The head mounted display according to claim 6, wherein the controller is configured to combine the plurality of thumbnail images generated in a period in which the disturbance value exceeds the critical value to generate the representative thumbnail image.

8. The head mounted display according to claim 6, wherein the controller is configured to display the plurality of thumbnail images represented by the representative thumbnail image, instead of the representative thumbnail image, upon acquisition of a selection signal for the representative thumbnail image.

9. The head mounted display according to claim 1, wherein the controller is configured to divide the field of vision into a plurality of areas, and select an area having a lowest disturbance value among the plurality of areas as the virtual area.

10. The head mounted display according to claim 1, wherein the controller is configured to set an area in which the disturbance value is low in a changed field of vision as the virtual area when the field of vision is changed.

11. The head mounted display according to claim 1, wherein the sensor includes at least one of at least one camera configured to photograph at least one of the field of vision and the eyes of the user, and a microphone configured to sense noise around the head mounted display.

12. The head mounted display according to claim 1, wherein the controller is configured to acquire selection of the user for the displayed thumbnail image through at least one of a gesture of a hand in the 3D space, a voice of the user and touch of the user applied to a touchpad provided to the head mounted display.

13. The head mounted display according to claim 1, wherein the controller is configured to display the first thumbnail image along with the content in the virtual area during display of the content.

14. The head mounted display according to claim 1, wherein the controller is further configured to determine whether a color and a shape of the virtual area are uniform based on the image of the area in front of a user, capture by a camera, and set an area having low disturbance as the virtual area in which the content will be displayed.

15. A method of controlling a head mounted display, the method comprising:
 displaying content in a virtual area within the field of vision of a user;
 calculating a disturbance value based on a disturbance sensed by a sensor;
 determining whether the disturbance value exceeds a critical value;
 generating a first thumbnail image using an image of the content displayed at a time when the disturbance value exceeds the critical value;
 displaying the first thumbnail image on a part of the virtual area while continuing to display the content, wherein the first thumbnail is first displayed in the virtual area when the disturbance value exceeds the critical value; and
 playing the content back again from the time in the virtual area in response to an input for selecting the displayed first thumbnail image, wherein the time corresponds to a time when the first thumbnail is generated.

16. The method according to claim 15, further comprising sensing at least one of visual change of an area overlapping with the virtual area, change of external noise generated during display of the content, change of a content reception state during display of the content, and change of a gaze direction of the user during display of the content.

17. The method according to claim 15, wherein there is a plurality of thumbnail images, further comprising generating a representative thumbnail image representing the plurality of thumbnail images and displaying the representative thumbnail image instead of at least part of the plurality of thumbnail images.

* * * * *